Figure 1A:
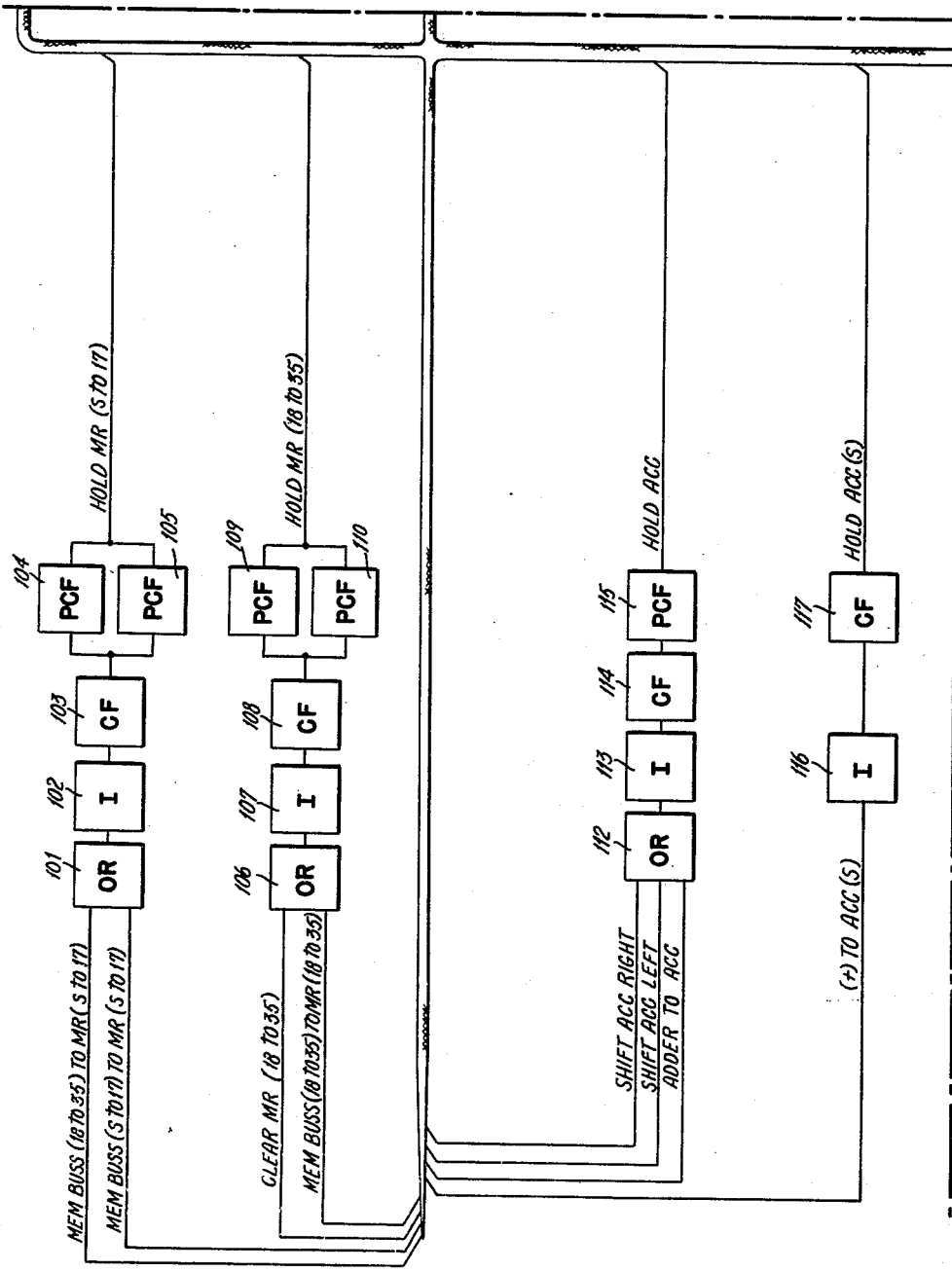

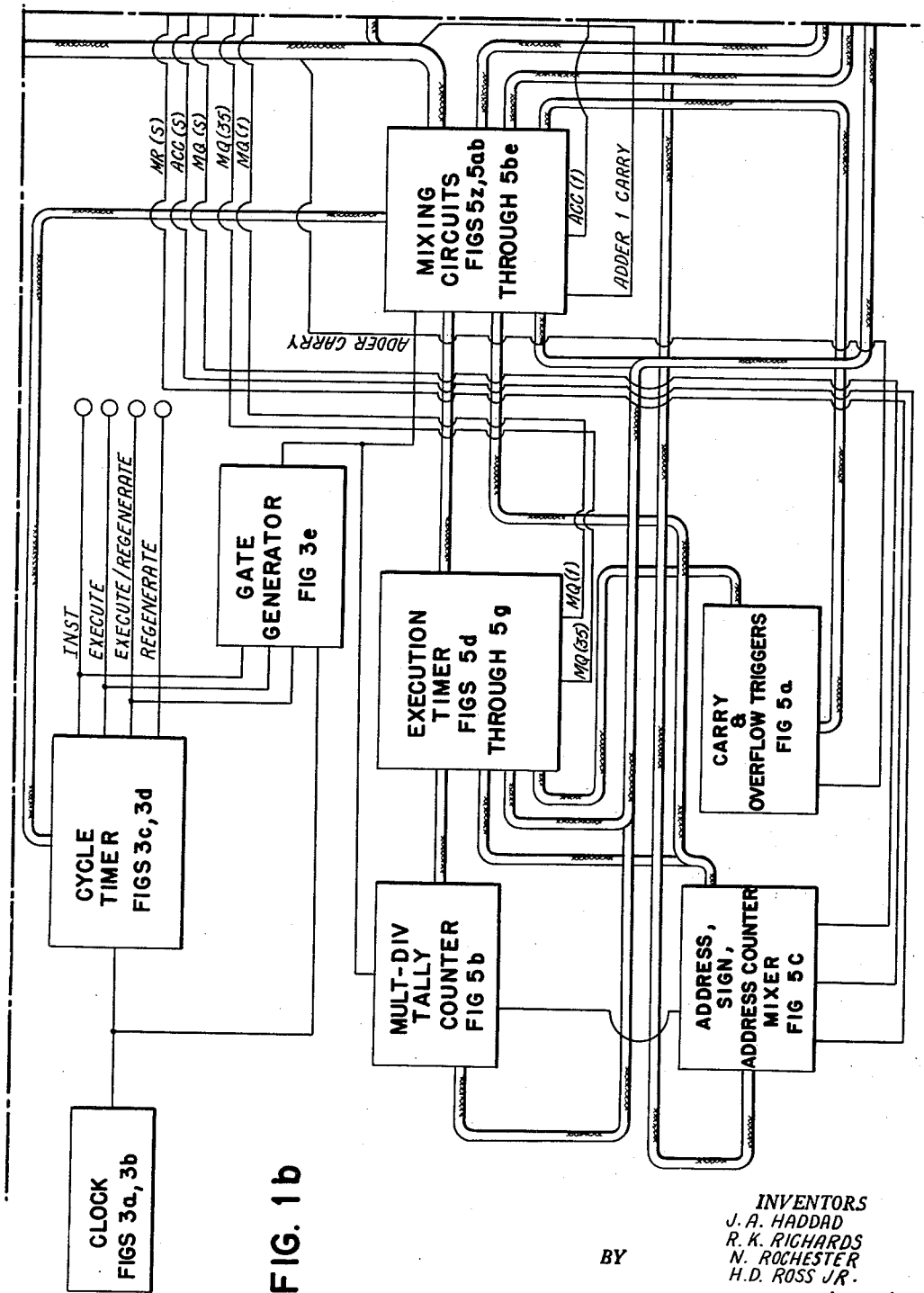

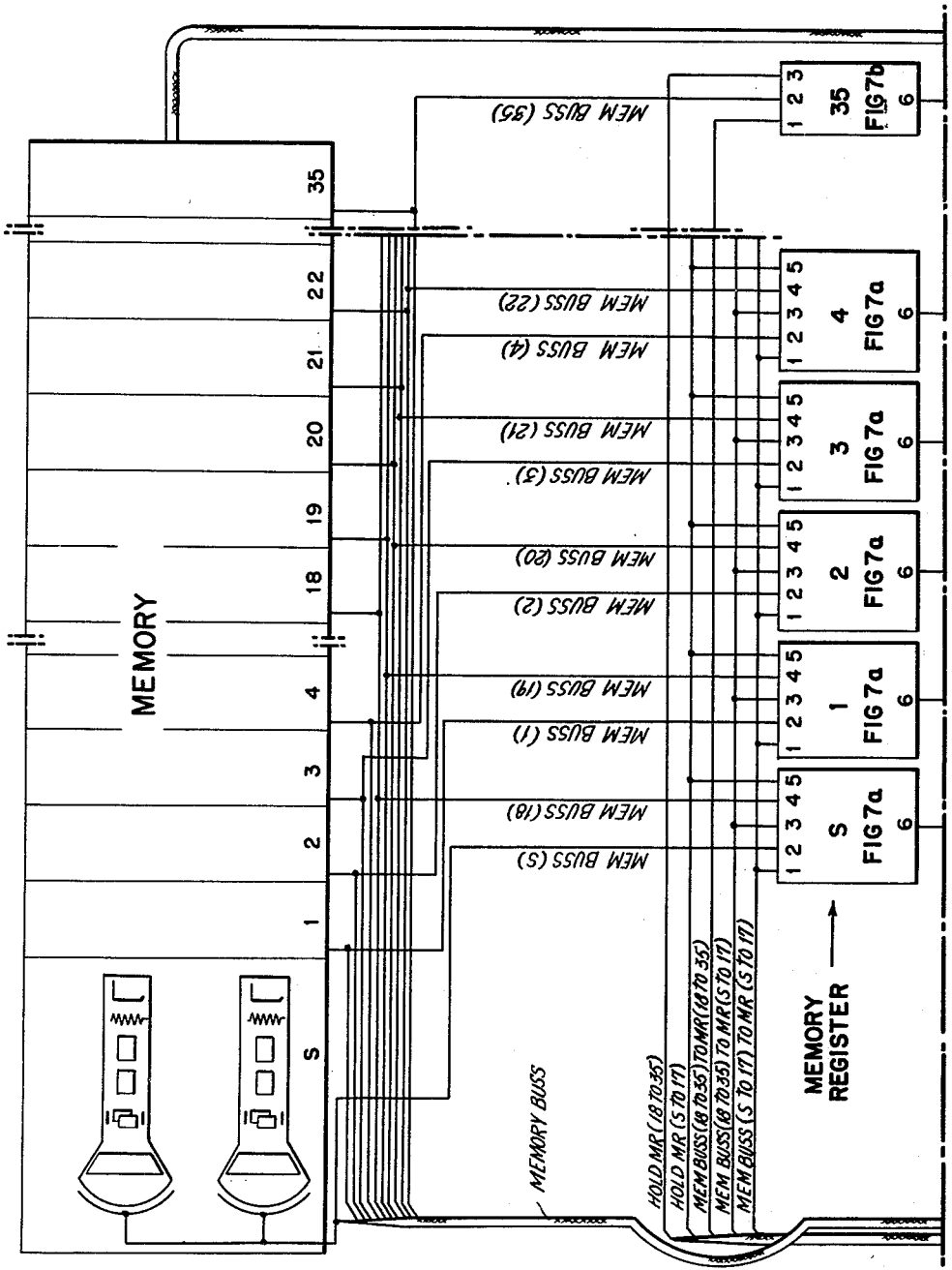

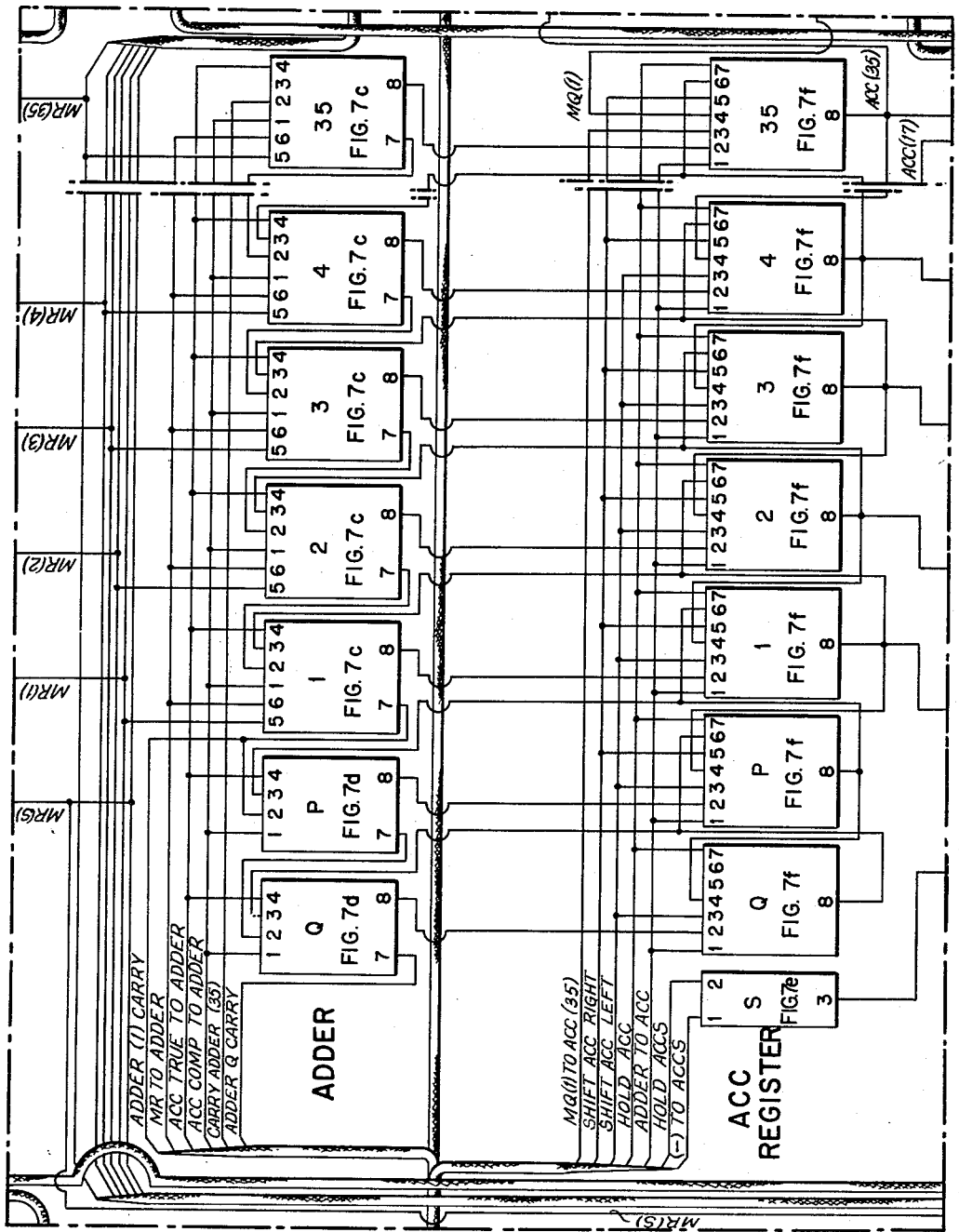

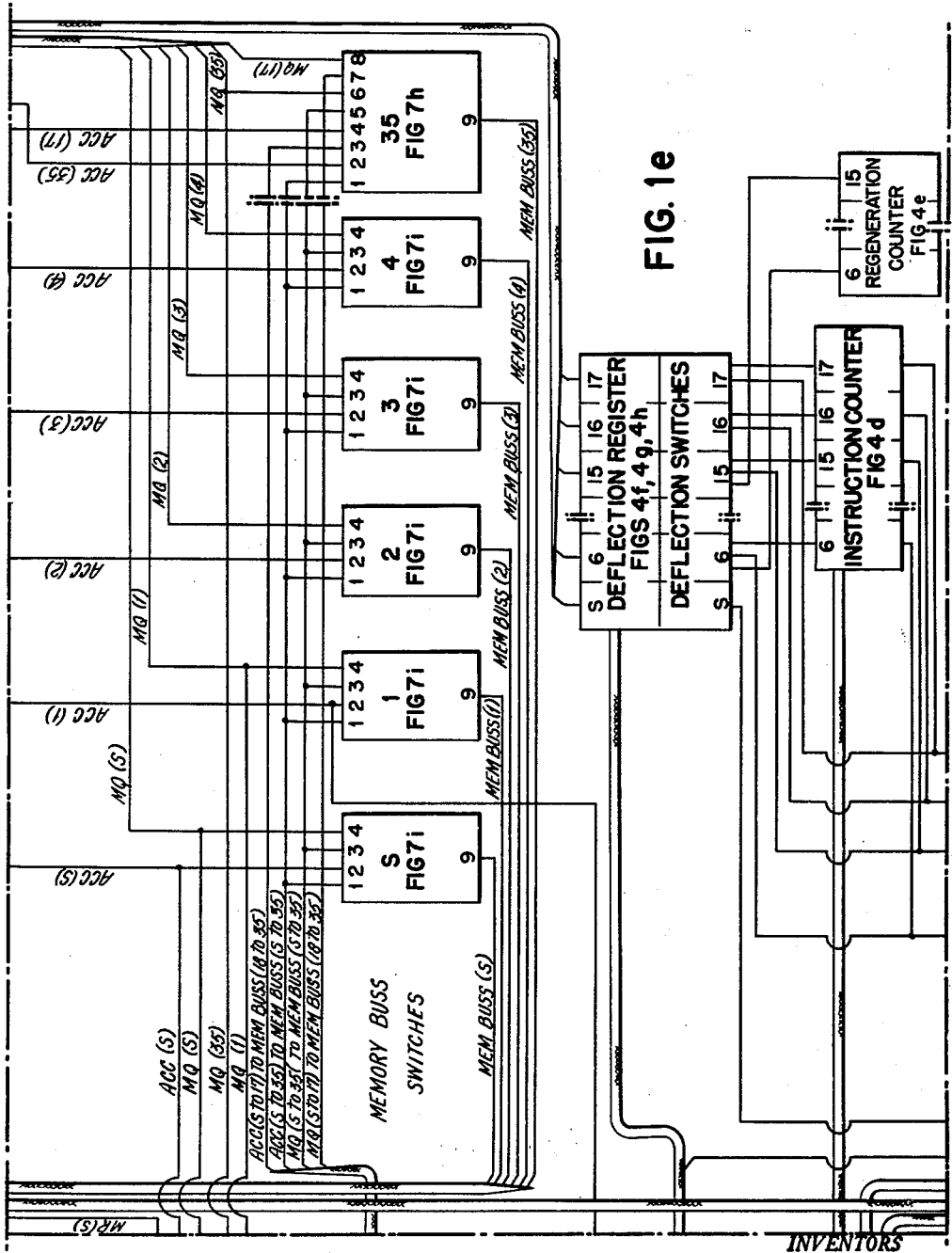

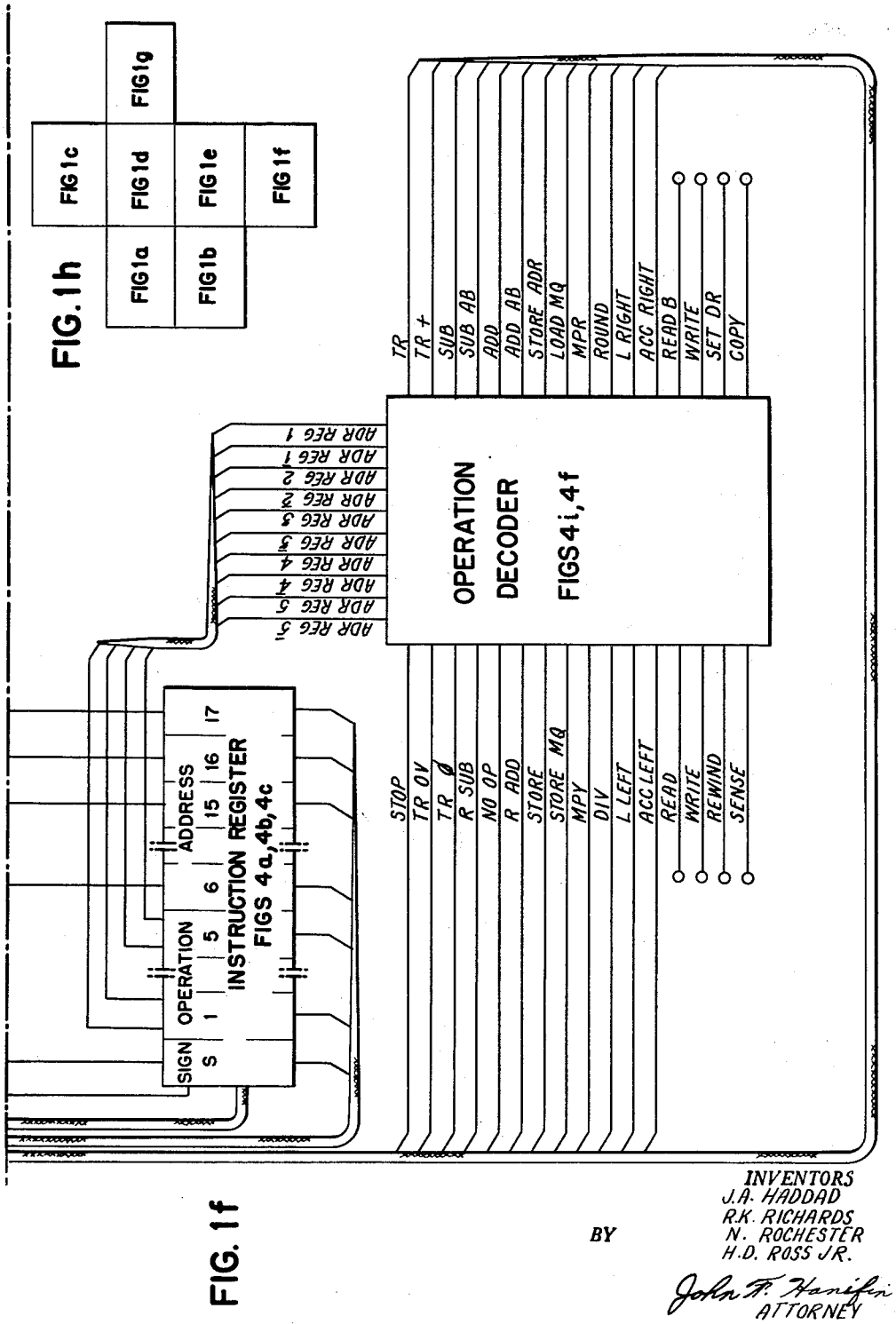

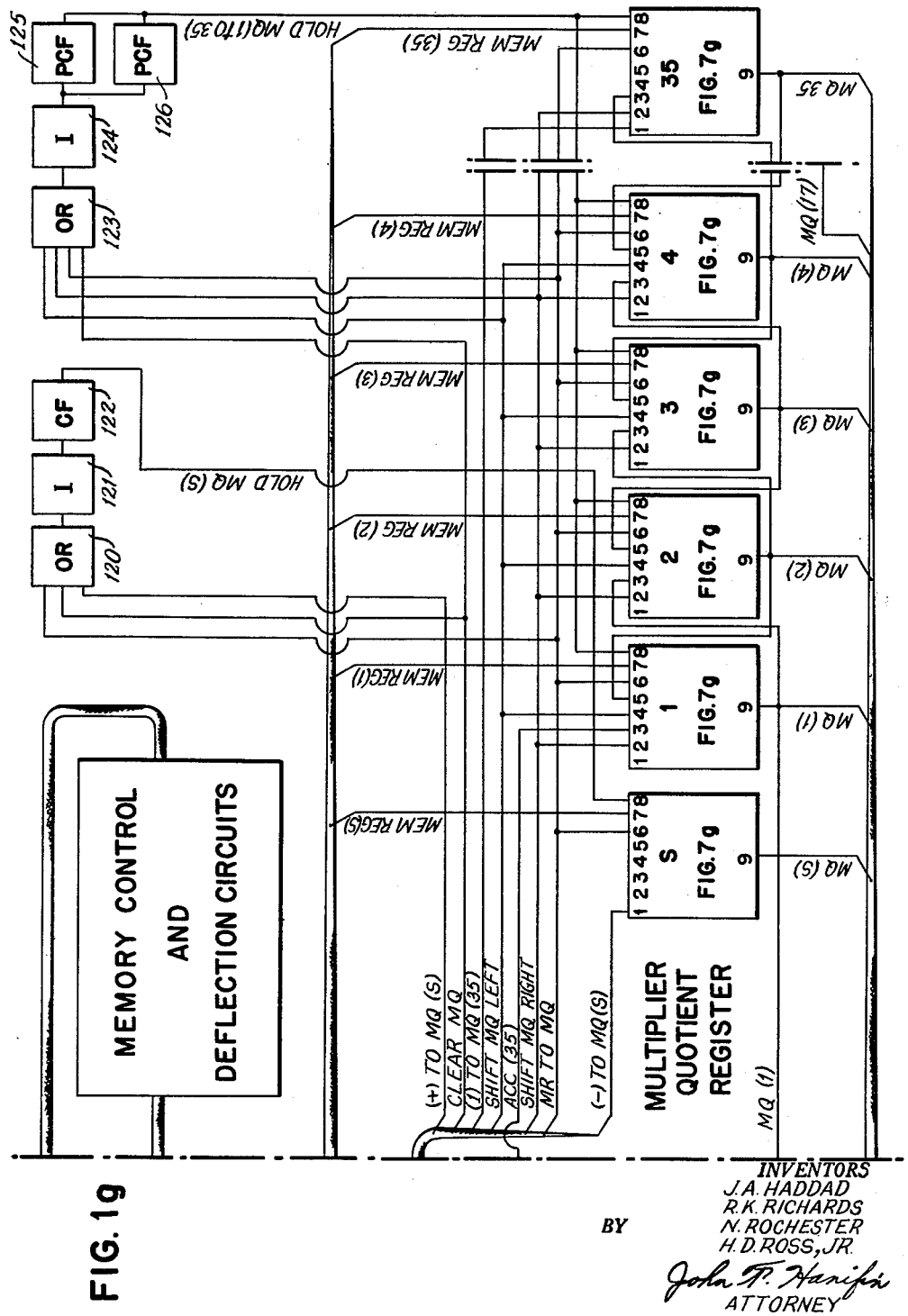

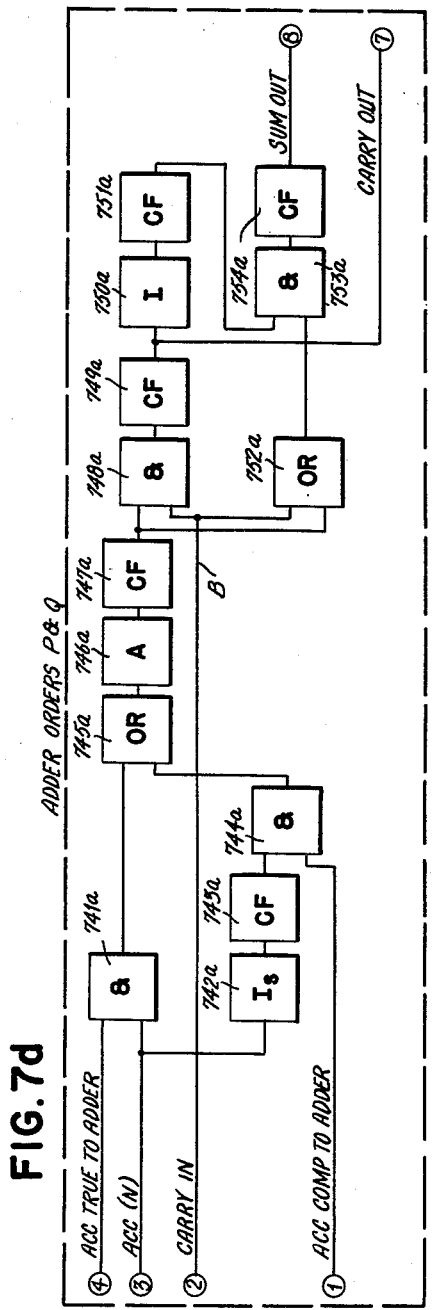

FIG. 7e     ACCUMULATOR REGISTER — S ORDER
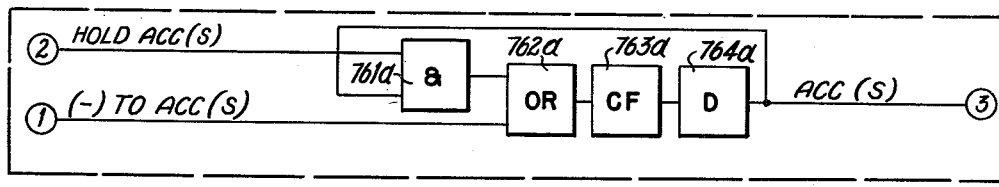
FIG. 7f     ACCUMULATOR REGISTER — ORDERS Q, P, AND 1 through 35
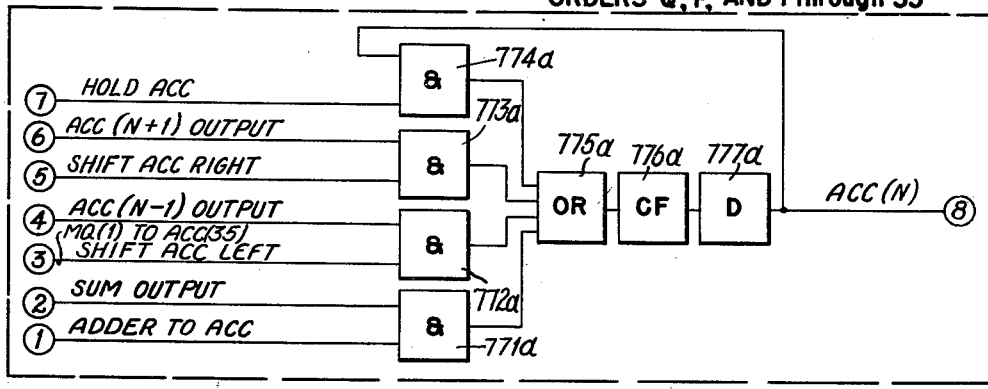
INVENTORS
J. A. HADDAD
R. K. RICHARDS
N. ROCHESTER
H. D. ROSS JR.
BY
ATTORNEY

3,197,624
ELECTRONIC DATA PROCESSING MACHINE
Jerrier A. Haddad, Binghamton, Richard K. Richards, Poughkeepsie, Nathaniel Rochester, Wappingers Falls, and Harold D. Ross, Jr., Poughkeepsie, N.Y., assignors to International Business Machines Corporation, New York, N.Y., a corporation of New York
Original application Mar. 30, 1954, Ser. No. 419,642, now Patent No. 2,974,866, dated Mar. 14, 1961. Divided and this application June 27, 1960, Ser. No. 42,458
18 Claims. (Cl. 235—175)

The present invention relates to a Calculator for performing binary calculations on data; derived from the cathode ray tube storage elements comprising the Memory of an Electronic Data Processing Machine. This application is a division of an application of J. A. Haddad et al., Serial No. 419,642, filed March 30, 1954, now U.S. Patent No. 2,974,866, entitled "Electronic Data Processing Machine."

As set forth below, in A BRIEF OUTLINE OF THE CALCULATOR, the Calculator, per se, is operated by a Program, stored in Memory, said Program including Instructions for initiating certain Arithmetical processes upon data, also stored in said Memory. The Calculator is of the parallel type comprising 35 orders and a Sign order and all 35 orders are handled, in parallel.

The Calculator, per se, comprises a 36 order Memory Register, comprising 35 orders and a Sign order; a 35 order Adder, each comprising a full binary adder, of logical AND and OR circuits and additional circuitry and two overflow orders, each comprising half binary adders of logical AND and OR circuits and additional circuitry; an Accumulator Register, of 35 orders, for storing data, two overflow orders and a Sign order, each comprising a Delay Unit, as the storing element, per se, of each order, which Unit, as described below, has the inherent faculty of emitting an output indication, of a previously stored bit, as a new bit is simultaneously applied to the input of said Unit. Another register called the Multiplier Quotient Register (MQ) comprising 35 orders and a Sign order also utilizes a Delay Unit, as the storage element, per se. The 35th order of the Accumulator Register is connective to the Multiplier Quotient 1 order and vice versa, whereby the MQ and the Accumulator Register are shiftable, as a unit, any desired number of steps, either to the right or to the left. As pointed out below, the logical nature of the Adder and the unique characteristic of simultaneous input and output of the Delay Units, along with the fact that the outputs of the Accumulator Register Delay Units are respectively connected to inputs of the Adder orders, and operable to deliver True or Complement representations of the respective values, stored in said Accumulator Register, while outputs of the respective Adder orders are respectively connected to the inputs of the Delay Units of the Accumulator Register, provide a Calculator wherein carries ripple through almost instantaneously and due to the simultaneous input/output feature of the Delay Units, "tentative" arithmetical operations can be performed and can also be completed or not completed, selectively, in accordance with operating conditions, whereby extremely rapid calculations are produced, at speeds heretofore unheard of, and limited only by the operating speeds of the circuit components, per se.

Further, Sign indicating and checking devices are provided whereby the Calculations may be performed in accordance with the Signs and including special operations particularly involving Signs, and the results of said Calculations are stored, with the proper Sign indications.

Means are provided, as stated above, to read Instructions from Memory and control data handling in accordance with these Instructions, both data and the Instructions being stored in Memory, at selectable Addresses. As described below, Instructions comprise half words of 18 bits, including Sign, read from Memory to the Memory Busses and via the Memory Busses to a Memory Register, hereinafter referred to as the MR and from the MR to an Instruction Register having a Sign storage portion, an Operation storage portion and an Address storage portion, which latter is also operative, as a Count Down Counter, to count the number of certain steps, during for example, MULTIPLY, DIVIDE or SHIFT operations. The Instruction Register stores binary 1 and binary zero manifestations, the permutations thereof stored in said Operation portion being DE-CODED by an Operation Decoder which, in turn, controls various Control Circuits including Execution Timers and Mixing Circuits, all as described below, whereby each of the Instructions, so de-coded, is respectively carried out.

When data comprising full or half words are read from Memory to the MR, it may be read to the Adder and thus to the Accumulator Register.

Said Memory Register is also connective to said Multiplier Quotient Register, referred to hereinafter as the MQ to thus transfer data from Memory via the MR to said MQ. Such data, delivered to the MQ or to the Adder, as mentioned above, may comprise FULL or HALF words, a FULL word comprising two HALF words and consisting of 35 bits and the Sign bit, all as described below.

Overflow and Carry triggers are provided to indicate when an overflow occurs from the regular orders to the overflow orders of said Accumulator Register and to indicate carries, from the highest order of said Adder and also from the highest overflow order thereof. Various other circuits are provided, as described in detail below, to provide means whereby a large number of arithmetical and data handling operations can be performed under control of Instructions stored in said Memory, and Read out, therefrom, to said various circuits, including said Operation Decoder.

Among the Operations which are performed are STOP AND TRANSFER, TRANSFER, TRANSFER ON AND RESET OVERFLOW, TRANSFER ON ZERO, ADD, RESET AND ADD, ADD ABSOLUTE VALUE, SUBTRACT, RESET AND SUBTRACT, SUBTRACT ABSOLUTE VALUE, NO OPERATION, STORE, STORE ADDRESS, STORE NUMBER FROM MQ, LOAD MQ, MULTIPLY, ROUND, MULTIPLY AND ROUND, DIVIDE, LONG SHIFT LEFT, LONG SHIFT RIGHT, SHIFT ACCUMULATOR LEFT, and SHIFT ACCUMULATOR RIGHT.

Various other Operations are performed by said Electronic Data Processing Machine, as set forth in the co-pending application of Philip E. Fox et al., Serial No. 417,702, filed March 22, 1954, now Patent No. 2,950,465, issued August 23, 1960. Still other operations, particularly those utilizing Input/Output units, such as magnetic tapes, are disclosed in the co-pending application of Bartelt et al., Serial No. 401,648, filed December 31, 1953, now Patent No. 2,850,234, issued September 2, 1958, and in the co-pending application of Bartelt et al., Serial No. 401,502 filed December 31, 1953, now Patent No. 2,921,293, issued January 12, 1960, and still other operations, particularly those utilizing Magnetic Drums, are disclosed in the co-pending application of Werner Buchholz et al., Serial No. 316,914, filed October 25, 1952, now Patent No. 2,863,134, issued December 2, 1958.

One of the objects of the present invention, therefore, is to provide, means for carrying out, efficiently and at high speed, certain of these operations and particularly those pertaining to Arithmetical operations.

Another object of the present invention is to provide a full binary adder comprising, in combination, a first diode OR circuit having three inputs, its output feeding to a first diode AND circuit, a second AND circuit having three inputs, its output feeding to a second diode OR circuit, said second OR circuit having an output feeding to said first AND circuit, a third diode AND circuit having two inputs and its output feeding via a third diode OR circuit, to an inverter, said inverter output feeding to said second OR circuit, a fourth AND circuit having two inputs, its output feeding to said third OR circuit and a fifth AND circuit having two inputs, its output feeding to said third OR circuit, said first AND circuit providing a sum output of binary 1 or binary 0, when binary 1 and binary 0 inputs are applied to the respective inputs of said other AND circuits or the respective inputs of said first OR circuit, and said third OR circuit providing a carry output, of binary 1 or binary 0.

Still another object is to provide a device having an object, as above, and including means selectively feeding True or Complement representations, of binary 1's and binary 0's, of a first factor, to said first OR circuit, and comprising one input to each of said second, third and fourth AND circuits, respectively.

A further object is to provide a device having an object, as above, and including means for producing a carry input, to said first OR circuit and comprising one input to each of said second, fourth and fifth AND circuits, respectively.

Another object is to provide a device having an object, as above, and including means providing binary 1 or binary 0 inputs, representative of a second factor, to said first OR circuit, and to said second, third and fifth AND circuits, respectively.

A further object is to provide a device having an object, as above, said True Complement input circuits comprising a first AND circuit having a True input thereto and a second AND circuit, means producing a conditioning potential for said first AND circuit, for passing said True value input therethrough to said full binary adder, means including an inverter connected to said True input and applying its output to said second AND circuit to thus apply a Complement value input, and means producing a conditioning potential for said second AND circuit, for passing said Complement value input therethrough, to said full binary adder.

Other objects of the invention will be pointed out in the following description and claims and illustrated in the accompanying drawings, which disclose by way of example, the principle of the invention and the best mode which has been contemplated of applying that principle.

Since the invention herein relates to an electronic data processing machine, the details of which are set out fully in the aforementioned parent application (Haddad et al. Patent No. 2,974,866), the specification herein has been largely curtailed. Specifically, the description and drawings corresponding to Haddad patent FIGURES 2a–7c and 7g–8c have been eliminated from this specification. The remaining figures herein retain their original numbering for easy cross reference to said Haddad et al. patent.

In the drawings:

FIGS. 1a, 1b, 1c, 1d, 1e, 1f and 1g taken together, as shown in FIG. 1h, comprise an overall block diagram of the Calculator.

FIG. 7d comprises a block diagram of a half adder and true complement controls representative the Adder orders P and Q.

FIG. 7e comprises a block diagram of the Sign order of the Accumulator Register.

FIG. 7f comprises a block diagram of an Accumulator Register order, representative of orders Q, P and 1 through 3.

A BRIEF OUTLINE OF THE CALCULATOR

In the novel Calculator comprising this invention, words of 36 bits or half words of 18 bits are manifested or recorded in a pure binary system of notation. In such a binary notation, only two digit values exist, that is, 0 and 1, and these respective binary 0 or binary 1 digits are referred to as bits. The binary point corresponding to a decimal point in a decimal system may of course, occupy any position in the pure binary word. The digital position or orders of a binary number, reading from RIGHT to left, of the binary point, correspond in value to $2^0$, $2^1$, $2^2$, $2^3$, $2^4$, $2^5$, etc. or decimal digits 1, 2, 4, 8, 16, 32 etc. respectively. The digital position or order for a binary number, reading from LEFT to right, of the binary point, correspond in value to $2^{-1}$, $2^{-2}$, $2^{-3}$, $2^{-4}$, $2^{-5}$, etc., or the decimal or fractional values $\frac{1}{2}$, $\frac{1}{4}$, $\frac{1}{8}$, $\frac{1}{16}$, $\frac{1}{32}$, $\frac{1}{64}$, respectively. The novel Calculator of this invention normally performs operations, on full words, which as stated above consisting of 36 bits comprising 35 bits (binary digits) and a sign bit. However, for economy of operation, any of the full words may be split into two half words, each half word as stated above, consisting of 18 bits, comprising 17 bits and a sign bit. A binary number of a full word of 36 bits has a precision equal to that of about a 10 decimal digit number, and the half word corresponds in precision to a number of about 5 decimal digits. As described below, the calculator operates according to a stored program, this program comprising instructions each of which is a half word.

The position of the binary point is determined more or less by the programmer, and the arithmetic operations such as addition, subtraction, multiplication, division, and the like, must be performed according to definite rules. The programmer must keep track of the binary point position.

FIGS. 1a through 1g, taken together, and arranged as shown in FIG. 1h, comprise an overall block diagram of an Electronic Data Processing Machine including the novel Calculator and showing, in general, the relationship of the various Units which make up this Machine. The Memory Unit as used in the machine and as illustrated by a labeled block, in FIG. 1c, comprises cathode ray tubes used as electrostatic data storage means which have a maximum capacity of 2,048 full words of storage (36 bits per word). These 2,048 full words, are stored, on 36 sets, of cathode ray tubes and since any full word may be split into two half words, thet total number of half words, which can be stored, is 4,096. The number of cathode ray tubes provided, is chosen at 36, since in the novel Calculator of this invention a full word is 36 bits, so that with 36 sets of cathode ray tubes, 36 bits may be read out of the Memory Unit simultaneously or 36 may be stored, in the Memory Unit, simultaneously, during one cycle of operation. This simultaneous operation is referred to as parallel operation. The Memory Unit, employed herein is shown, described and claimed in the copending application of Philip E. Fox et al., Serial No. 417,702, filed March 22, 1954, now Patent No. 2,950,465 issued August 23, 1960.

The timing of the Calculator is controlled by a Clock which comprises a twelve stage electronic trigger ring. The Clock develops 12 master timing pulses of one microsecond duration each, and a character cycle, of the Calculator, will be defined as one twelve microsecond period (one complete cycle of the Clock). The Clock is illustrated by the labeled block in FIG. 1b.

There are four general types of character cycles existing the Machine operation. These four types of cycles are called Instruction, Execute, Execute/Regenerate, and Regenerate cycles, which are respectively abbreviated as I, E, E/R and R. The type of cycle at any certain time is controlled by a Cycle Timer, also illustrated by a labeled block in FIG. 1b.

As set forth in said above identified copending application of Fox et al., the electrostatic storage which comprises Memory for the Machine may be addressed, and the information, stored in Memory, at the respective addresses, may be read out to a Memory Register. All information leaving the Memory Units, enters this Memory Register which comprises 36 Delay Units, S, and 1 through 35, inclusive, each of the type as described below, along with associated switching circuits. The Memory Register designated hereinafter as MR, functions as a buffer storage between Memory and the Computer. The 36 Delay Units of this MR provide storage for 36 bits read from Memory and hold these bits until they are called for by the Calculator. Information is read, out of Memory into the MR, in parallel fashion, that is, 36 bits are read, simultaneously, for a full word, or 18 bits, simultaneously, for a half word. If 36 bits are read they are read into all 36 Delay Units of MR but if a half word is read, they are always read into the Delay Units S, and 1 through 17 of the MR. Information thus read into the MR may not only be transferred to the Calculator but also via a Register of the Calculator, described presently, to other Units of the Machine. The Adder (FIG. 1d) represented by labeled blocks, comprises 37 columnar orders, two, of which, are overflow columns P and Q. Each of the columnar orders 1 through 35 of the Adder consists of a group of circuits, as described in detail later, comprising three inputs, and two outputs.

The three inputs are (1) an output from a corresponding column of the MR; (2) an output from a corresponding column of an Accumulator Register described below; (3) a carry output from the Adder columnar order to the right.

The two outputs are: (1) the sum output; (2) a carry output. The sum output is fed to a corresponding column of the Accumulator Register, while the carry output goes, to the Adder column, to the left. In conjunction with means for controlling the flow of information, the Adder circuitry performs the functions of addition, subtraction, multiplication and division, all as described presently, multiplication and division consisting of a series of additions or subtractions and shifts, so that multiplication and division are also performed, in part, by the Adder circuitry. The Adder is not a register, per se, and therefore does not perform any function of storage, but merely operates, on the information as it is passed therethrough.

The Accumulator Register is used for storing the output of the Adder, and the combination, of the Adder and the Accumulator Register, may be regarded as an Accumulator. The Accumulator Register stores the results, of the operation performed, by the Adder. It consists of 38 columns, 2 of which, namely, Q and P, are for the purpose of overflow, and the other 36 comprising the 35 binary bits, of a full word, and the sign. Each of the columns of the Accumulator Register consists of a Delay Unit, similar to that used in the MR and the contents of the Accumulator Register may be shifted, either to the left or the right. The contents of the Accumulator Register, excluding the contents, of the overflow columns, may be stored, in Memory, by a STORE Instruction, which is given with a Memory address. In this STORE operation, the number is stored, in Memory, and the same number is left unaltered in the Accumulator Register.

The Multiplier Quotient Register, hereinafter referred to, as the MQ has two major functions. One, as its name implies, it holds the Multiplier, for multiplication operations and the Quotient, in division operations. The MQ comprises 36 columns, one, of which, stores a manifestation of the sign of the number stored in the MQ, the remaining 35 columns storing manifestations of the multi-digit number itself. Each column contains a Delay Unit, of the type used in the MR, along with suitable switching circuits. Words may be read, from Memory, via the MR into the MQ register by means of a LOAD MQ Instruction, which includes a Memory address, and the contents of the MQ may be read out, and via Memory Bus Switches, be stored in Memory, by means of a STORE MQ Instruction which includes a Memory address. These Memory Bus Switches are illustrated in FIG. 1e, and are effective, as described below, to switch the holding of the Accumulator Register to the Memory Busses, for either full or half words, during a STORE Instruction, or to shift the contents of the MQ, either full or half words, to the Memory Busses, during a STORE MQ Instruction.

The Instruction Register (FIG. 1f) which may receive information from the MR, serves as a storage Register for an Instruction (a half word) read, from Memory, during an Instruction cycle. The Instruction Register stores the coded binary bit representation, of a particular Instruction, until this Instruction is completely executed, and it is then reset, during the early part of the next Instruction cycle, before a new Instruction, is read, into it from Memory. Thus, the Instruction Register holds the complete Instruction and the Operation part, of this Instruction is available to an Operation Decoder (FIG. 1f) until the particular operation is complete, while the Address portion of the Instruction, is available to a Deflection Register (FIG. 1e) as described below. This Deflection Register comprises a plurality of electronic triggers, each, respectively storing a binary bit representation, of the sign bit, and also of bits 6 through 17, inclusive. An Address Counter portion, of the Instruction Register, is utilized during multiply and divide operations, for the purpose of counting the number of cycles that the Machine completes, during the respective such operations. The purpose of this counter is to insure that a proper number of character cycles occurs, during each of these operations.

The Instruction Counter (FIG. 1e) is a 12 stage counter, each stage comprising an electronic trigger, the Counter output being fed to the Deflection Register during each Instruction cycle. The Instruction Counter receives a pulse at the END of each Operation so that on the next Instruction cycle, a succeedingly numbered address in Memory, will be referred to. The Instruction Counter may under certain conditions, also be stepped to cause a skipping of Instructions.

The Regeneration Counter (FIG. 1e comprises ten stages each including an electronic trigger, respectively storing binary bit representations of the bits 6 through 15, inclusive. The Regeneration Counter output, is fed to the Deflection Register during Execute/Regenerate and during Regenerate cycles and is stepped, one count, for each such cycle so that succeeding numbered addresses, in Memory, are addressed and Regenerated, during successive Execute/Regenerate and Regenerate cycles.

The Deflection Register has 12 orders, each comprising an electronic trigger, whose outputs feed to the Memory Deflection circuits and the Memory Control circuits. This Deflection Register therefore serves as a buffer between the Instruction Register, the Instruction Counter and the Regeneration Counter, on one hand and the Memory Deflection circuits and the Memory Control circuits, on the other hand. The Memory Deflection 1 and Memory Control circuits, represented by the labeled block in FIG. 1g, are identical to those described in detail in said above identified Fox et al, application are effective to ADDRESS and UNBLANK the respective cathode ray tubes comprising Memory for both READING out of or WRITING in Memory.

The Operation Decoder decodes the manifestations of the "1" to "5" bit permutations which comprise the Operation part, of the Instruction to determine which one, of 32 possible Instructions, the machine will perform. The Operation Decoder comprises a diode matrix circuit and receives these permuted inputs and produces one output only, of any one of 32, thus signalling the particular kind of operation that is to be performed. The Operation Decoder, in accordance with which one of its 32 outputs is thus engaged, conditions selectively, various control circuits, which in turn produce the respective type of operation called for.

The information stored in Memory, is categoried into two general classes, according to the purpose for which it is used. These are Instructions and numerical information which is to be processed in accordance with the particular Instruction. The Calculator is made to distinguish between Instructions and numerical information by the selected type of cycle, causing Reading from memory. Information Read-out of Memory, during an Instruction cycle is CHANNELED to the Instruction Register where the stored manifestations of the bits Read-Out comprises a representation of the Instruction. Information Read-out during an Execute cycle, is handled as numeric data. Numeric data is available, either in half words of 18 bits or in full words of 36 bits, but Instructions are ALWAYS half words. The Gate Generator, illustrated in FIG. 1b, controls the basic timing of the machine and provides signals which are used in the respective operations, as described later. The Address, Sign, and Address Counter Mixer circuits illustrated by a labeled block in FIG. 1b combine the outputs from the Sign bits, of the MR, the Accumulator Register, and the MQ, to provide signals indicating that the Signs, are alike or unlike, and also passes signals, from the Instruction Register indicating when the Address Counter reaches a desired count during a multiply or a divide operation and whether a full, an even half or an odd half word is addressed. Outputs from these circuits feed to the Execution Timer and to the Mixing circuits.

A "carry" trigger is utilized to supply an indication that an end carry has occurred from the "Q" position of the Adder during certain operations. An Overflow trigger is utilized to supply an indication that a carry has occurred from the Adder "1" position to the overflow position "P" during certain operations or that a binary 1 has been shifted left from the Accumulator Register 1 position to the Accumulator Register "P" position during other operations.

The Multiply Divide Tally Counter represented by a labeled block in FIG. 1b controls the type of cycle, that occurs, during multiply and divide operations, as described below. The Execution Timers via the Mixing circuits, control the data processing throughout the Machine. The particular Execution Timer controlling during a particular type of operation is that Execution Timer related to the particular operation, for example, during an ADD operation, the ADD Execution Timer takes control.

INSTRUCTION REPERTOIRE OF THE MACHINE

In order to obtain a solution for a given problem, a Program is provided comprising a sequence of Instructions, and the respective Operations, carried out under control of these Instructions, in the sequence in which they appear or determined by intermediate results produce the desired solution of the problem. Both the Program and the numeric data for the problem are stored in the machine, the programmer, designing the program so that the steps are carried out in the proper manner.

Before proceeding to the description of the Machine construction and operation a brief discussion of the Instruction Repertoire of the Machine will greatly aid in comprehending fully, the description which later follows. As stated above, each Instruction is stored in a coded permutation of binary 1 and binary 0 representations, each Instruction including 5 such bits to represent, by their permutations of binary 1 and binary 0 bit conditions each of 32 operations, which are recognized respectively by the Operation Decoder whose outputs, respectively control circuits to carry out the particular Instruction so de-coded.

One such Instruction whose 5 coded binary 1 and binary 0 bit values are 00000, comprises STOP and TRANSFER. This Instruction controls circuits which STOP the Calculator as soon as this Instruction is read from Memory. When the Calculator, is again started up, by the operator, the execution of this STOP and TRANSFER Instruction is not completed and the Program transfers, so that Instruction, at the Memory Address, specified by the Address part, of the STOP Instruction. The Program of Instructions will then continue sequently, from this last Address.

The Instruction TRANSFER whose binary 1, binary 0 code representation is 00001 causese the NEXT Instruction to be taken from THAT Memory Address, specified by the Address part, of this TRANSFER Instruction. The Program of Instructions, then continues, Address number by Address Number sequentially, from this last Address.

The Instruction, TRANSFER ON AND RESET OVER FLOW abbreviated TR OV whose code representation 00010, will, if the Overflow indicator is ON, as the result of a previous operation, cause the Program to TRANSFER THE Instruction, at the Memory Address, specified by the Address part, of the TR OV Instruction. The Overflow Indicator is reset, upon the completion of this Instruction. If the Overflow Indicator is OFF, and this TR OV Instruction occurs, the transfer is NOT executed.

The Instruction TRANSFER ON PLUS abbreviated TR+ whose code representation is 00011, will if the Sign of the word in the Accumulator Register, is positive, cause the Program to transfer to the Instruction at THE Memory Address specified by the Address part, of the TR+ Instruction. If the Sign of the word in the Accumulator Register, is negative, the transfer is NOT executed. It is to be particularly noted, that a positive zero value stored in the Accumulator Register is treated as a positive word, while a negative zero value stored therein, is regarded as a negative word.

The Instruction TRANSFER ON ZERO, abbreviated TR ZERO, whose code representation is 00100 will, if the value of the number stored in the Accumulator Register, is zero, cause the Program to transfer to THE Instruction, at the Memory Address, specified by the Address part, of the TR ZERO Instruction. If the value of number stored in the Accumulator Register is not zero, the last transfer is NOT executed.

In order to clarify the description, certain of the following Instructions will be described by means of numerical examples. In these examples, the binary point will be arbitrarily considered as occuring in a position between the P and the "1" orders, of the Adder and of the Accumulator Register. In other words, bits 1 through 35, are to the right of the binary point, while bits P and Q, are to the left of the binary point. In most of the numeric illustration, only 3 or 6 bits, that is binary digits, are illustrated, merely to limit the number of bits to be considered, the modus operandi remaining the same as it would be for a full word of 36 bits or a half word of 18 bits.

The Instruction ADD whose code representation is 01001 causes the number, in THE Memory Address, specified by the Address part, of the ADD Instruction to be added, to the number stored in the Accumulator Register. The sum, appears in this Accumulator Register, as will be seen from the description below, while the word, at the specified Memory Address, remains unchanged. The number Read from Memory at the Address specified may be either a full or a half word and, if a half word is specified, it is added, in alignment with the contents of the left half of the Accumulator Register (bit positions 1 through 17) but the sum, which appears in the Accumulator Register is of course the sum of the full Accumulator contents plus the half word value. If ths addition produces carries, to the left of the binary point, which, as stated above, lies to the left, of the "1" position, the overflow portion of the sum, appears in the two positions P and Q, to the left of the binary point and the Overflow Indicator, is turned ON.

If an ADD operation results in a zero, value in the Accumulator Register, the Sign of this zero, is the SAME Sign that was stored in Accumulator Register, PRIOR to initiation of the ADD operation. Thus a negative zero, will appear as the sum stored in the Accumulator Register, if a positive number, is added to a negative number, of equal magnitude, in the Accumulator Register. Various examples of this ADD Instruction are as follows:

| Number from Memory | Accumulator Register Before Operation | Accumulator Register After Operation |
|---|---|---|
| +.011 | +00.011 | +00.110 |
| +.011 | −00.011 | −00.000 |
| −.010 | −00.010 | −00.100 |
| −.010 | +00.010 | +00.000 |
| +.110 | −00.011 | +00.011 |
| −.000 | +00.000 | +00.000 |
| +.110 | +00.110 | +01.100* |
| +.110 | +11.110 | +00.100* |

*Overflow Indicator is turned ON if it is not already ON.

The Instruction RESET AND ADD, abbreviated R ADD, whose code representation is 01010 causes the contents of the Accumulator Register to be replaced by the word at the Memory Address indicated by the Address part, of this R ADD Instruction. If a half word is specified, it appears in the left half of the Accumulator Register, that is in bit positions 1 to 17, inclusive while the right half of the Accumulator Register is Reset to 0. The overflow positions, of the Accumulator Register, are always reset to 0, by this Instruction. Various examples of this Instruction are as follows:

| Number from Memory | Accumulator Register Before Operation | Accumulator Register After Operation |
|---|---|---|
| +.011 | anything | +00.011 |
| −.011 | anything | −00.011 |
| +.000 | anything | +00.000 |
| −.000 | anything | −00.000 |

The Instruction ADD ABSOLUTE VALUE, abbreviated ADD AB, whose code representation is 01011 causes the absolute value (value, neglecting Sign) of the number at the Memory Address specified by the Address part, of this Instruction, to be added to the number stored in the Accumulator Register. The sum, appears in the Accumulator Register, while the word at the Address specified, in Memory, remains unchanged. This Instruction, is the same as the ADD Instruction, except that the number, from Memory, is treated as positive, regardless of its actual Sign. Various examples of this Instruction are as follows:

| Number from Memory | Accumulator Register Before Operation | Accumulator Register After Operation |
|---|---|---|
| +.010 | +00.011 | +00.101 |
| −.010 | +00.011 | +00.101 |
| +.010 | −00.011 | −00.001 |
| −.110 | −00.110 | −00.000 |
| −.110 | +00.110 | +01.100* |

*Overflow Indicator is turned ON if it is not already ON.

The Instruction SUBTRACT, abbreviated SUB whose code representation is 00101 is the same as the ADD Instruction, except that THE Sign of the number, read from the designated Memory Address, is CHANGED, before this number is added, to the number in the Accumulator Register. In other words, the subtraction is performed algebraically, with the result being stored in the Accumulator Register and the number, in Memory, remaining unchanged. Various examples of this Instruction are as follows:

| Number from Memory | Accumulator Register Before Operation | Accumulator Register After Operation |
|---|---|---|
| +.011 | +00.011 | +00.000 |
| +.011 | −00.011 | −00.110 |
| −.010 | −00.010 | −00.000 |
| −.010 | +00.010 | +00.100 |
| +.110 | −00.011 | −01.001* |
| −.000 | +00.000 | +00.000 |
| +.110 | +11.110 | +11.000 |

*Overflow Indicator is turned ON if it is not already ON.

The Instruction RESET AND SUBTRACT, abbreviated R SUB whose code representation is 00110 causes the number, at the specified Memory Address, to be placed, in the previously Reset Accumulator Register, except that the Sign of the number from Memory is changed. This Instruction is equivalent to Resetting the Accumulator Register and then performing the operation of subtract. Various examples of this are as follows:

| Number from Memory | Accumulator Register Before Operation | Accumulator Register After Operation |
|---|---|---|
| +.011 | anything | −00.011 |
| −.011 | anything | +00.011 |
| +.000 | anything | −00.000 |
| −.000 | anything | +00.000 |

The Instruction SUBTRACT ABSOLUTE VALUE, abbreviated SUB AV, whose code representation is 00111 causes an operation, similar to the ADD Instruction, except that the number, read from the specified Memory address, is treated as negative regardless of its actual Sign. Various examples of this Instruction are as follows:

| Number from Memory | Accumulator Register Before Operation | Accumulator Register After Operation |
|---|---|---|
| +.010 | +00.011 | +00.001 |
| −.010 | +00.011 | +00.001 |
| +.010 | −00.011 | −00.101 |
| −.110 | −00.110 | −01.100* |
| +.110 | +00.110 | +00.000 |

*Overflow Indicator is turned ON if it is not already ON.

The Instruction NO OPERATION, abbreviated NO OP causes nothing to happen. The result of this Instruction is to progress the Program to the NEXT Instruction. The Address and the Sign of this Instruction, may have any values, being without significance since this Instruction causes nothing to happen. This Instruction, however, finds utility, where it is desired to, in effect, delete an Instruction from a Program. In such an event, the substitution by the Programmer of a NO OPERATION Instruction for some other Instruction, allows the machine, to proceed, WITHOUT requiring the substitution of another Instruction, in place of the deleted Instruction.

The Instruction STORE whose code representation is 01100 causes the word, in the Accumulator Register to be stored, in Memory at the Address specified by the Address part, of the STORE Instruction. The contents of the Accumulator Register are not changed by this operation, but the word, which was originally stored at THE Address in Memory, is lost by this operation. The bits, in the overflow positions of the Accumulator Register that is bits P and Q, are NOT included, in the STORE operation. When a full word Address is specified, by the Address part, of the STORE Instruction, the Sign and the 35 bits, to the right, of the binary point, that is, bits 1 through 35 of the Accumulator Register are stored at the specified Address in Memory. When a half word Address is specified, by the Address part of the Instruction, the Sign, and bits 1 to 17, inclusive only, of the Accumulator Register, are stored in the half word Address specified in Memory.

The Instruction STORE ADDRESS abbreviated STORE A whose code representation is 01101 causes 12 bits at the extreme right of the half word, in the specified Memory Address, to be REPLACED, by the 12 bits of the "6" through "17" bits of the Accumulator Register of a right half word or the 12 bits of the "24" through "35" bits of a right half word.

The remaining 5 bits of the half word (representing the operational portion of the Instruction in this half word) stored in Memory at the specified Address and its Sign, are left unchanged. The contents of the Accumulator Register are not changed by this operation. It should be particularly noted that this Instruction is used, with half word Addresses, only.

An example of this Instruction STORE ADDRESS is as follows:

Accumulator Register  +00.00 111 <u>000 111 000 111</u> 000 111 000

111 000 111

Selected Memory Address Before  −.01 010 101 010 101 010

Selected Memory Address After  −.01 010 <u>000 111 000 111</u>

(The underlined portion indicates those bit positions affected.)

The Instruction STORE NUMBER FROM MQ, abbreviated STORE MQ whose code representation is 01110 causes the number in the MQ to be stored, at the Memory Address specified by the Address part of the Instruction. The contents of the MQ are not changed by this operation, but the number, which was originally stored, at the specified Memory Address, is lost. When a full word Address is specified in the STORE MQ instruction, the entire content of the MQ are stored at the Memory Address specified. When a half word Address is given, the left hand 18 bits (The Sign and bits 1 through 17) in the MQ are stored at the half word Memory Address.

The Instruction LOAD MQ Register, abbreviated LOAD MQ whose code representation is 01111 causes the number in the MQ to be replaced by the number from the Memory Address specified by the Address part, of the Instruction. This Instruction may be used with either full or half word Addresses. If a half word is specified, it is entered into the left half of the MQ (bit positions, S, and 1 through 17) and the right half of the MQ is reset to zero. Various examples of this Instruction are as follows:

| Word from Memory | MQ Register Before Operation | MQ Register After Operation |
| --- | --- | --- |
| +.011 | anything | +.011 |
| −.011 | anything | −.011 |
| −.000 | anything | −.000 |

The Instruction MULTIPLY abbreviated MPY whose code representation is 10000 causes the Accumulator Register to be reset to 0 and the number, at the Memory Address specified by the Address part, of the MULTIPLY Instruction, (the multiplicand) is multiplied by the number in the MQ (the multiplier). The more significant 35 bits, of the product, appear in the Accumulator Register, the less significant 35 bits appear in the MQ. The Signs, of both the Accumulator Register and of the MQ are set, to the Sign of the product, according to the algebraic Sign rules. When a negative number is multiplied by a positive number and either part, or the whole of the product, is zero, this zero is given a negative Sign.

The multiplicand from the specified Memory Address, may be either a full or a half word. If a half word is specified, the MULTIPLY Instruction operates, as though it were a full word, with 18 zeros on the right. The MQ is always treated as if it contained a full word, even though a half word has just been placed in it. Thus, if a half word has been put into the MQ and a MULTIPLY Instruction is given, with a half word Address, the product would have 34 significant bits and would appear in bit positions 1 through 34 inclusive, of the Accumulator Register. The remaining bit position 35, of the Accumulator Register and the entire MQ would then contain zeros. In the following examples, the Accumulator Register and the MQ are illustrated with maximum contents of five bit positions only to the right of the binary point, instead of the actual 35 positions. Full words, from Memory, are represented as 5 bits and a Sign, half words are represented as 2 bits and a Sign.

| Number from Memory | MQ Before MPY | Accumulator Register After MPY | MQ After MPY |
| --- | --- | --- | --- |
| −.11 | −.11 001 | +00.10 010 | +.11 000 |
| +.10 001 | −.11 001 | −00.01 101 | −.01 001 |
| −.11 100 | +.10 010 | −00.01 111 | −.11 000 |
| +.10 101 | +.10 010 | +00.10 000 | +.01 010 |
| −.11 | −.11 000 | +00.10 010 | +.00 000 |
| +.00 001 | −.00 110 | −00.00 000 | −.00 110 |
| −.00 000 | +.10 101 | −00.00 000 | −.00 000 |
| +.01 000 | +.10 000 | +00.00 100 | +.00 000 |

The Instruction ROUND whose code representation is 10011 carries out an operation which, if the most significant bit (in position 1) of the MQ contains a binary 1, the value of the number in the Accumulator Register is increased, by a value equal to $2^{-35}$.

When the Instruction given is a ROUND Instruction the number, in the Address portion, has no significance, thus any values may be used in that portion. Various examples of the ROUND Instructions are as follows; recalling that with the 5 bit capacity illustrated the 5th bit assumes the identity of the least significant bit which corresponds in operation to the 35th bit of the Accumulator Register.

| Accumulator Register Before Round | MQ Before Round | Accumulator Register after ROUND | MQ after ROUND |
| --- | --- | --- | --- |
| +00.01 100 | +.10 000 | +00.01 101 | +.10 000 |
| +00.01 100 | +.01 000 | +00.01 100 | +.01 000 |
| +00.11 111 | −.10 000 | +01.00 000* | −.10 000 |
| −00.10 011 | +.10 000 | −00.10 100 | +.10 000 |

*Overflow Indicator goes ON if it is not already ON.

The Instruction MULTIPLY and ROUND abbreviated MPY R, whose code representation is 10001 carries out a regular multiply operation which is followed, by a round operation. Various examples of MULTIPLY AND ROUND operations are as follows:

| Number From Memory | MQ Before MPY R | Accumulator Register after MPY R | MQ after MPY R |
| --- | --- | --- | --- |
| −.11 | −.11 001 | +00.10 011 | +.11 000 |
| +.10 001 | −.11 001 | −00.01 101 | −.01 001 |
| −.11 100 | +.10 010 | −00.10 000 | −.11 000 |
| +.11 101 | +.10 010 | +00.10 000 | +.01 010 |

The Instruction DIVIDE, abbreviated DIV whose code representation is 10010 performs the basic operation of dividing a 70 bit dividend by a 35 bit divisor to produce a 35 bit quotient and a 35 bit remainder. Before the divide operation is performed, the more significant 35 bits of the dividend are placed in the Accumulator Register and the less significant 35 bits of the dividend are placed in the MQ. Then, as the DIVIDE Instruction is given, its Address specifying the Memory Address of the division. Upon completion of the divide operation, the quotient, appears in the MQ and the remainder appears in the Accumulator Register as will be obvious from the detailed description of the divide operation given later. The sign of the dividend is stored, in the Sign position of the Accumulator Register. When the DIVIDE Instruction is given, the Sign of the MQ is ignored. The less significant 35 bits of the dividend which are stored in the MQ are considered as increasing the magnitude of the more significant half of the dividend (that is the 35 bits stored in the Accumulator Register). As a result of the divide operation, the Sign of the quotient stored in the MQ is that given by the algebraic Sign rule. The Sign, of the remainder, remains the same as that of the original dividend, the DIVIDE Instruction may be given, with either full or half word Addresses. Half word divisors are considered as if they were full words, with the 17 significant bits, in the positions, immediately to the right, of the binary point, and the remaining 18 bit positions (to the right) conataining zeros. IF the DIVIDEND IS EQUAL TO or GREATER than the DIVISOR, SO THAT the ABSOLUTE VALUE of the QUOTIENT IS 1 or GREATER, (assuming we are working in fractional values) the CALCULATOR STOPS, as illustrated below. In the following examples of a divide operation, the Memory Address, the Accumulator Register, and the MQ, are illustrated as if they had a capacity of only 5 bits, to the right of the binary point, instead of the actual 35 bits.

| Number from Memory (divisor) | ACC. REG. Before DIV. | MQ Before DIV | ACC REG. after DIV. (remainder) | MQ after DIV (quotient) |
|---|---|---|---|---|
| | | (dividend) | | |
| −.10 110 | +00.01 101 | +.01 010 | +00.01 000 | −.10 011 |
| −.10 110 | +00.01 101 | +.01 010 | +00.01 000 | −.10 011 |
| −.01 100 | −00.00 110 | −.11 011 | −00.00 011 | +.10 010 |
| +.11 101 | +00.10 010 | −.00 100 | +00.00 000 | +.10 100 |
| +.11 100 | −00.00 000 | +.11 001 | −00.11 001 | −.00 000 |
| +.00 000 | +00.01 100 | +.00 000 | Calculator stops: DIV CHECK | |
| +.01 000 | −00.01 010 | −.01 011 | Calculator stops: DIV CHECK | |

The Instruction LONG SHIFT LEFT, abbreviated L LEFT whose code representation is 10100 causes the contents of the Accumulator Register and of the MQ to be shifted, to the left, by a number of spaces, specified by the Address part of the Instruction. The bits, which are shifted to the left, come from the MQ register and appear, at the right side of the Accumulator Register. When the L LEFT Instruction is given, the Sign of the Accumulator Register is changed, if necessary, to conform to the Sign of the MQ. The Sign of the MQ is not affected by this operation. The Overflow Indicator is turned ON, if any bits, are shifted to the left, that is any binary 1 bits, are shifted, to the left of the binary point in the Accumulator Register. The number of places shifted cannot exceed 255, but of course, this number, is almost without significance, since a shift of 70 will produce all zeros, in the Accumulator Register and in the MQ. The Sign of this Instruction, has no significance. The following examples of L LEFT assume that the Accumulator Register has a 9 bit capacity and the MQ a 7 bit capacity.

| Instruction* | Original Contents of— | | Final Contents of— | |
|---|---|---|---|---|
| | Accumulator Reg. | MQ | ACC. REG. | MQ |
| L LEFT 0003 | +00.001011 | +.010010 | +01.011010 | +.010000** |
| L LEFT 0003 | +00.001011 | −.010010 | −01.011010 | −.010000** |
| L LEFT 0000 | +00.001011 | −.010010 | −00.001011 | −.010010 |
| L LEFT 0080 | −00.001011 | +.010010 | +00.000000 | +.000000** |

*Address is given in the decimal equivalent of the binary number.
**Overflow Indicator is turned ON if it is not already ON.

The Instruction LONG SHIFT RIGHT abbreviated L RIGHT whose code representation is 10101 causes the contents of the Accumulator Register and the MQ to be shifted, to the right, by the number of places specified by the Address part of the Instruction. Bits which are shifted to the right, out of the Accumulator Register, are shifted, into the leftmost positions (exclusive of Sign) of the MQ. When a L RIGHT Instruction is given, the Sign of the MQ is changed, if necessary, to conform to the Sign of the Accumulator Register. The Sign of the Accumulator Register and the Overflow Indicator are NOT affected by this operation. Again the number of places which shift can take place, cannot exceed 255 and again, this is almost without significance if a shift of more than 70 places is required. The Sign of this Instruction has no significance. The following examples of the Instruction L RIGHT are given with an assumed capacity of 9 bits for the Accumulator Register and 7 bits for the MQ.

| Instruction* | Original Contents of— | | Final Contents of— | |
|---|---|---|---|---|
| | Acc. Reg. | MQ. | Acc. Reg. | MQ. |
| L RIGHT 0003 | +00.001011 | +.010010 | +00.000001 | +.011010 |
| L RIGHT 0003 | +00.001011 | −.010010 | +00.000001 | +.011010 |
| L RIGHT 0000 | +00.001011 | −.010010 | +00.001011 | +.010010 |
| L RIGHT 0001 | −11.001011 | +.010010 | −01.100101 | −.101001 |
| L RIGHT 0080 | −11.001011 | +.010010 | −00.000000 | −.000000 |

*Address given in the decimal equivalent of the binary number.

The Instruction SHIFT ACCUMULATOR LEFT, abbreviated A LEFT whose code representation is 10110 causes the contents of the Accumulator Register to be shifted, to the left, by the number of places specified by the Address part, of the Instruction. The emptied places, to the right, in the Accumulator Register, are filled with zeros, and the Sign of the number, in the Accumulator Register is not changed. THE LAST TWO BITS SHIFTED PAST THE BINARY POINT, APPEAR IN THE OVERFLOW POSITIONS of the Accumulator Register, and ANY BITS SHIFTED BEYOND THESE OVERFLOW POSITIONS ARE DISCARDED. AS the BITS ARE SHIFTED, PAST the BINARY POINT, THEY ARE SAMPLED and if a binary 1 is so shifted, the Overflow Indicator is turned ON. This condition, may be detected, by a subsequent TRANSFER ON OVERFLOW Instruction. Again, the number of places called for by such a shift, cannot exceed 255. The Sign of this Instruction has no significance. The following examples of A LEFT Instructions assume that the Accumulator Register, has a capacity of 9 bits.

| Instruction* | ACC. REG. Before Operation | Acc. Reg. after operation | Overflow Indicator Before | Overflow Indicator After |
|---|---|---|---|---|
| A LEFT 0001 | −00.001011 | −00.010110 | OFF | OFF |
| A LEFT 0003 | +00.001011 | +01.011000 | OFF | ON |
| A LEFT 0003 | +00.001011 | +01.011000 | ON | ON |
| A LEFT 0001 | +00.001011 | +00.010110 | ON | ON |
| A LEFT 0006 | +00.001011 | −11.000000 | OFF | ON |
| A LEFT 0037 | +00.001011 | +00.000000 | OFF | ON |
| A LEFT 0000 | +00.001011 | +00.001011 | OFF | OFF |

*The address part, of the Instruction, is given, in the decimal equivalent of the binary number Addresses; all other columns contain binary numbers.

The Instruction SHIFT ACCUMULATOR RIGHT abbreviated A RIGHT whose code representation is 10111 causes the contents of the Accumulator Register to be shifted, to the right, by a number of places specified by the Address part, of the Instruction. The empty places, to the left, in the Accumulator Register, are filled with zeros, and the bits which are shifted, beyond position 35 of the Accumulator Register, are lost. THE TWO OVERFLOW POSITIONS, to the left of the imaginary binary point, ARE INCLUDED IN THIS SHIFT operation. The Sign of the Accumulator Register is not altered, nor is the Overflow Indicator affected by this operation. Again, the number of places which may be shifted, cannot exceed 255, and the Sign given with this Instruction, is of no significance. The following examples of a SHIFT Instructions assume that the Accumulator Register has a capacity of 9 bits (instead of the actual 38).

| Instruction* | Accumulator Register Before Operation | Accumulator Register After Operation |
| --- | --- | --- |
| A RIGHT 0003 | +11.001011 | +00.011001 |
| A RIGHT 0003 | −00.001011 | −00.000001 |
| A RIGHT 0037 | +00.001011 | +00.000000 |
| A RIGHT 0037 | −00.001011 | −00.000000 |
| A RIGHT 0000 | +00.001011 | +00.001011 |

*The Address part, of the Instruction, is shown in the decimal equivalent of the binary number Address; all other numbers are in binary form.

Before proceeding to the description of the operation of the various units comprising the Machine, and in particular the CALCULATOR, the detailed circuit diagrams of various standard circuit components employed as logical AND circuits, logical OR circuits, or as triggers, inverters, cathode followers, Delay Units, etc., will be described in detail, with reference being made to their labeled block symbols. Thereafter, properly labeled block symbols, representative of these respective components, will be used in the various figures, of the drawings, it being understood that the contents of the respective blocks comprise identical or similar detailed circuitry. It is deemed obvious that those skilled in the art can, as required by operation conditions make the necessary changes in the values of the condensers, resistors, inductances, tube types voltages etc., to provide the most efficient operation under the particular electrical conditions that are encountered. The values herein given are those which have been found most efficient in an actually constructed and operated Electronic Data Processing Machine, including the novel Calculator of instant application.

Before proceeding to the description of the Counters, Registers, Control and Mixing Circuits, a detailed description of several standard component circuits employed, such as logical "AND" circuits, logical "OR" circuits, triggers, inverters, cathode followers, and delay elements, etc. will be given. The properly labeled block symbol representative of these respective components, as they appear in the various figures of the drawings, will thus be understood to comprise identical or similar detailed circuitry, it being obvious to those skilled in the art that changes in the values of components and in the particular assemblages would be made to provide the most efficient operation under the electrical conditions that are encountered. The values given are exemplary only.

A description of standard components of which the present invention may be embodied is found beginning at column 27 of said Haddad et al. Patent 2,974,866. A computer system within which the adder sub-system in accordance with the present invention may be used is described in detail in said patent, between column 36, line 75 and column 114, line 48 thereof.

Referring now to FIG. 7d, which illustrates an exemplary circuit representative of the Adder orders P and Q, the input, from the "corresponding" order of the Accumulator Register, passes through True-Complement control circuits, identical to those described above for the Adder orders 1 through 35, blocks 741a through 747a of FIG. 7d, corresponding to the blocks 711a through 717a of FIG. 7c. Thus, it is seen that signals, on line "A" of the Adder per se, in FIG. 7d, represent either True or Complement, binary 0 or binary 1 value manifestations, from corresponding orders of the Accumulator Register. Likewise, when input terminal 2 (FIG. 7d) is positive, to represent a binary 1 Carry, it is fed via the line CARRY IN, to line B of the Adder, per se. The operation of the remaining circuitry of FIG. 7d, is that of a half Adder, having two inputs. If there are binary 1 inputs, that is positive signals, on both lines A and B, simultaneously, the resulting SUM is zero, with a Carry of a binary 1. If there is a binary 1 present on line A, but a binary 0 on line B, the result is a binary 1 SUM and a binary 0 Carry. Likewise, if there is a binary 0 on line A, but a binary 1 on line B, the result is a SUM of binary 1 and NO Carry. The final condition, if there are binary 0's on both lines A and B, produces a SUM of binary 0, and a Carry of binary 0. The output of the AND circuit 748a is positive, only when it receives two positive inputs, so that if both lines, A and B, have binary 1's, the output of the AND circuit 748a goes positive, and via a cathode follower 749a, drives the line CARRY OUT, positive, which is applied to terminal 7. When a binary 1 is present, on either line A or B, or both, the output of the OR circuit 752a, goes positive, and conditions the AND circuit 753a. If a Carry output, did occur, which signifies that both lines A and B contain binary 1's, the positive output of a cathode follower 749a, signifying a binary 1, is inverted, by an inverter 750a, and passed via a cathode follower 751a to an AND circuit 753a. Thus, if both lines A and B contain binary 1's, the result is a Carry output, but the Sum output is BLOCKED, from passing through the AND circuit 753a. However, if a binary 1 is present on line A or B, there still is a positive output, from the OR circuit 752a, and, since there is NO Carry, the inverter 750a cannot invert, a plus input, since there is none, so that the AND circuit 753a IS conditioned, and a positive output from the OR circuit 752a passes through this conditioned AND circuit 753a, and the cathode follower 754a, to the line SUM OUT and thus to terminal 8.

Thus, it is seen that if binary 1's are present on both lines A and B, a binary 1 Carry output is developed, but the SUM output is a binary 0. If a binary 1 is present, on line A or B, a binary 0 Carry output is developed, but the SUM output is a binary 1. If binary 0's are present on both lines A and B, then both output lines, the SUM OUT and CARRY OUT, remain negative to signify binary 0's.

ACCUMULATOR REGISTER

Referring again, to FIG. 1d, a block diagram of the Accumulator Register is illustrated therein. It is to be noted that the Sign order (see also FIG. 7e) is different from all the other orders of the Accumulator Register (see FIG. 7f).

The Q, P and 1 through 35 orders, are alike and an exemplary order is illustrated in FIG. 7f.

Each order of the Accumulator Register comprises a Delay Unit, of the type as described above, and as indicated (FIGS. 7e and 7f, respectively), there are two sources of HOLD voltage namely, the line HOLD ACC (S) (FIG. 7e) and the line HOLD ACC (FIG. 7f).

The line HOLD ACC (S) for the Sign order is connected to terminal 2 (FIG. 7e), while the line HOLD ACC (FIG. 7f) is connected to terminal 7 and feeds to all the Accumulator Register orders Q, P and 1 through 35. These orders, Q, P and 1 through 35 each receive said input, from "corresponding" orders of the Adder and these same orders have outputs, which feed to respective terminals 3 (FIG. 1d) of the True/Complement controls, described above, of corresponding orders, of the Adder.

Order 35, of the Accumulator Register (FIG. 1d) receives an input via its terminal 4, from the MQ order 1 (FIG. 1g) which is effective, when the control line "MQ (1) TO ACC (35)" feeding to terminal 3 of this 35th order (FIG. 1d) goes positive (see also FIG. 7f) to permit the contents of MQ order 1 to be introduced into the Accumulator Register 35. On a LONG SHIFT LEFT Instruction or a DIVIDE Instruction, as described below, this signal "MQ (1) TO ACC (35)" is applied to terminal 3 of the 35th order, instead of SHIFT ACC LEFT (FIG. 7f). The outputs of "corresponding" orders of the Adder, are gated to the Accumulator Register as the line ADDER TO ACC connected to the respective terminals 1 (FIGS. 1d and 7f) goes positive. A signal on this line (FIG. 1a) also causes the line HOLD ACC, to go negative, at the same time, as described above, in connection with FIG. 1a. The holding of the Accumulator Register may also be shifted, to the right, or to the left, by positive signals on the respective lines SHIFT ACC RIGHT connected to the respective terminals 5, or line SHIFT ACC LEFT connected to the respective terminals 3 (FIGS. 1d and 7f), this shifting occurring, at the rate of one order, for each microsecond that the respective lines are positive. The signals on the lines SHIFT ACC RIGHT and SHIFT ACC LEFT (FIG. 1a) also respectively cause the line HOLD ACC to go negative (see also FIG. 7f).

It should be noted that the outputs at respective terminals 8 of the Accumulator Register orders feed to an input terminal 4, of the next higher order (FIG. 1d) and also to an input terminal 6, of the next lower order. It is these output signals, which are gated to the respective Delay Units, during a SHIFT ACCUMULATOR LEFT or a SHIFT ACCUMULATOR RIGHT operation, as the case may be, or during a LONG SHIFT LEFT or a LONG SHIFT RIGHT operation. The output of the Q order shifts to the right only, so that in FIG. 7f, the line SHIFT ACC LEFT is not used, in the Q order.

The output of Accumulator Register order 35, besides feeding to order 34 also feeds to terminal 3 of the MQ 1 order (FIGS. 1d, 1g). The orders S and 1 through 35 of the Accumulator Register also have outputs (FIGS. 1d and 1e) which feed to "corresponding" orders of the Memory Buss Switches, described below. As the Accumulator Register is shifted left, the output of the 1 order is connected to the MIXING CIRCUITS (FIGS. 1d, 1e, and 1b) and thence to the Overflow Trigger (FIG. 1b) as described above. Therefore, if a binary 1 is stored in the Accumulator Register 1 order, and the Accumulator Register is shifted to the left, one order, an Overflow automatically results.

Referring now to FIG. 7e, which illustrates the Accumulator Register Sign order, again the basic storage element is a Delay Unit designated as 764a. The condition of the Delay Unit is dependent upon the binary 1 or binary 0 character of the inputs, from either one of two sources. One is the recirculating feed back, feeding from the output of the Delay Unit and passing through the AND circuit 761a, provided the line HOLD ACC (S) connected to the terminal 2, is positive, to thereby condition this AND circuit 761a whose output then passes, via an OR circuit 762a and a cathode follower 763a, to the input of the Delay Unit 764a.

On occasions, when it is necessary to put a positive Sign indication into the Delay Unit, that is, a holding of a binary 0, the HOLD ACC (S) voltage only, is made negative (see inverter 116 and cathode follower 117 of FIG. 1a) so that the line HOLD ACC (S) of FIG. 7e is rendered negative, and thus, regardless of what was formerly stored in the Delay Unit, the Delay Unit output then goes negative, which need not be recirculated, since a negative output IS produced by the Delay Unit unless it is forced to produce a positive output, which positive output, must be recirculated to be sustained, all as described above under STANDARD COMPONENTS.

However, when it is necessary to enter a negative Sign, into the Accumulator Sign order (a binary 1) a positive signal is fed directly into the OR circuit 762a (FIG. 7e) via input terminal 1, to line "(—) TO ACC (S)" implying Minus Sign TO ACC (S) order. The effect of this positive input to this OR circuit 762a, which passes directly via the cathode follower 763a, to the Delay Unit 764a, even though the AND circuit 761a is operative for feed back, is to inject a binary 1, that is a positive signal, into the Delay Unit, regardless of what was there previously. The recirculating loop of the Delay Unit is NOT broken at this time. Thus, if a binary 1, was formerly stored in the Delay Unit, it is recirculated, in an attempt to again store a binary 1, which merely results, in a binary 1 being stored (if a binary 0 is stored, no recirculation is produced, since none is required). The output of the Sign position, via line ACC (S) to terminal 3, is POSITIVE to indicate the storage of a "negative" Sign and conversely if NEGATIVE to indicate a "positive" Sign. The output terminal 3, as indicated in FIGS. 1d and 1e is connected to terminal 2 of the Memory Buss Switches, order S, described below and also is connected, as shown in FIGS. 1e and 1a to the Sign Mixer circuits, described above in connection with FIG. 5c of said parent patent.

Referring to FIG. 7f, there is illustrated an exemplary circuit representative of the Accumulator Register orders Q, P, and 1 through 35. It may be noted (see FIG. 1d) that input terminals 5 and 6, of the Q position, are NOT used, so that consequently, the AND circuit 773a (FIG. 7f) and is corresponding output to the OR circuit 775a, are NOT employed, in this Q order. The circuitry of these orders is somewhat similar to the circuitry of the orders of the Memory Register, described above, in that a Delay Unit 777a (FIG. 7f) comprises the storage element, per se, of the respective orders. As illustrated in FIG. 7f, this Delay Unit 777a, may receive an input, via one of four AND circuits. This Delay Unit may receive an input, as its output is recirculated, via an AND circuit 774a, provided line HOLD ACC, which is connected to terminal 7, remains positive, thus conditioning this AND circuit, whose output passes via an OR circuit 775a, and a cathode follower 776a to this Delay Unit 777a. The signal on the line HOLD ACC, is of course, driven negative, as described above, whenever any SHIFT LEFT or SHIFT RIGHT signal is given, and ALSO when the holding of the Adder is being gated to the Accumulator Register. The effect of the interruption of this HOLD signal is effectively to erase, whatever is already stored in the Delay Unit, since only a binary zero can exist with this AND circuit 774a de-conditioned.

Referring to the AND circuit 773a of FIG. 7f, this receives input signals via line SHIFT ACC RIGHT connected to terminal 5, and via line ACC (N+1) OUTPUT connected to terminal 6, this line comprising the output, from the next higher order of the Accumulator Register. Upon a coincidence of two such positive inputs, the output of the AND circuit 773a goes positive, and via the OR circuit 775a and the cathode follower 776a applies a positive signal to the Delay Unit 777a. Thus, whenever a signal of 1 microsecond duration is given, calling for a SHIFT ACC RIGHT operation, the output of the next higher order of the Accumulator Register is gated via this AND circuit 773a to the Delay Unit 777a. At the time that the line SHIFT ACC RIGHT, goes positive, the line HOLD ACC, is negative, and is thus effective, to erase the former holding of the Delay Unit. At the end of the 1 microsecond period, the line HOLD ACC, again becomes positive, to HOLD the newly stored bit of information, which was received from the next higher order of the Accumulator Register. If the signal on the line SHIFT ACC RIGHT is of a sufficient duration, say several microseconds, a shift from the next higher order of the Accumulator Register occurs, during each microsecond, the line HOLD ACC remaining negative during that period. Thus, for each microsecond that the line SHIFT ACC RIGHT is positive, a bit of information, is successively shifted, one order, for each such microsecond, to succeeding lower orders of the Accumulator Register. It is an inherent characteristic of a Delay Unit such as Delay Unit 777a, as described above, which allows an input signal to arrive, at the Delay Unit input, at the same time an output signal is being emitted, by this Delay Unit, indicative of what was formerly stored in that Unit.

The AND circuit 772a serves a function, similar to that of AND circuit 773a, except that it is for SHIFT LEFT. Here, an input signal on terminal 3 is applied to line SHIFT ACC LEFT to condition this AND circuit 772a, while the output of the next LOWER order, of the Accumulator Register, is applied via terminal 4 to line ACC (N–1) OUTPUT and this output, from the next LOWER order, is passed via this AND circuit 772a, the OR circuit 775a, and the cathode follower 776a, to the Delay Unit 777a. Again, a shifting of a bit of information, to a successive order of the Accumulator Register (shifting to the left) occurs, for each microsecond that the line SHIFT ACC LEFT, is positive, line HOLD ACC remaining negative during that time.

The AND circuit 771a receives inputs from "corresponding" Adder order SUM outputs, via the terminal 2, feeding to the line SUM OUTPUT. If this AND circuit 771a is conditioned, by a positive voltage on line ADDER TO ACC connected to terminal 1, which may be either an E/R4 (D1) or an E/R8 (D1) signal (see Timing Diagram FIG. 6a–e) then the SUM OUTPUT is gated through this AND circuit 771a.

Thus, upon coincidence of two positive inputs, the output of this AND circuit 771a, goes positive, and via the OR circuit 775a and the cathode follower 776a, feeds a positive signal to the Delay Unit 777a. If the SUM OUTPUT of the "corresponding" Adder order is a binary 0, this signal on the line SUM OUTPUT, is negative, and the signal input to the Delay Unit 777a is negative, to thereby store a binary 0. The output of the Delay Unit 777a, feeds via line ACC (N) which thus is representative of any of the outputs, for orders Q, P and 1 through 35, respectively, each of which feeds to a respective output terminal 8. Thus, it is seen that the output of the Adder may be gated to the Accumulator Register, and that the holding of the Accumulator Register, may be shifted, left or right, a shift occurring at a rate of one order per microsecond.

It should also be noted, as stated above, that the signal MQ (1) to ACC (35) which feeds to terminal 3 of the Accumulator Register order 35 (FIG. 1d) on occasions, as described above, when the Accumulator Register and the MQ are being shifted jointly, to the left, as one register, the signal, on the line ACC (N–1) OUTPUT connected to terminal 4 (FIG. 7f) is actually coming from the MQ (1) output (FIG. 1d), while the signal to terminal 3 of the Accumulator Register 34 order, is actually the signal MQ (1) TO ACC (35) (FIGS. 1g and 1d).

There has also been described above, how signals on lines "(+) TO ACC (S)" and "(−) TO ACC (S)" will cause a direct insertion of a positive or negative Sign, respectively, in the Accumulator Register Sign order. Whenever a regular SHIFT ACC LEFT signal is given, for a shift operation that does NOT include the MQ, as described below, then the line HOLD ACC, connected to terminal 7 of the Accumulator Register 35 order, is driven negative, as usual, and as the information is shifted left, since NO binary 1, is shifted INTO the Accumulator Register order 35 from the MQ, then in effect, a binary 0 is stored in this Accumulator Register 35 order. In other words, if a signal called for a shift of 6 orders, and a binary 1 was present initially, in all Accumulator Register orders, then as the information is shifted left, binary 0's are effectively stored, in the Accumulator Register 35 order, and these binary 0's are shifted left, so that at the end of the 6 step shift operation, the last 6 orders of the Accumulator Register, namely, orders 30 through 35, all contain binary 0's.

The outputs of the Accumulator Register, via terminals 8, of the respective orders (FIG. 7f) are positive, to represent storage of binary 1's and negative to represent storage of binary 0's. These signals are fed (except for orders P and Q) mainly to the Memory Buss Switches, as illustrated in FIGS. 1d and 1e.

Descriptions of the MULTIPLIER QUOTIENT REGISTER; MEMORY BUSS SWITCHES, timing of TRANSFER, STOP AND TRANSFER, TRANSFER ON ZERO, TRANSFER ON OVERFLOW, TRANSFER ON PLUS, LOAD MQ, NO OPERATION, and ROUND operations are all given between column 118, line 63, and column 127, line 39 of said Haddad et al. Patent 2,974,866.

RULES GOVERNING ADDITION

Before proceeding to a discussion of the ADD Timing Diagram, illustrated on FIG. 6k of said parent patent, a few of the rules for binary addition, as performed by this Machine, will now be stated. During an ADD operation, the factors are added ALGEBRAICALLY, so that if the Signs are UNLIKE, the value, stored in the Accumulator Register is Complemented to a 1's Complement, and is added, in the Adder, to the True value of the number stored in the Memory Register. By such an addition of a Complement number to a True number, SUBTRACTION is actually performed.

If, in this ADD operation, the Signs are UNLIKE, and the 1's Complement of the value stored in the Accumulator Register is added, in the Adder, to the True value of the number stored in the Memory Register, and an END CARRY is produced, an "elusive 1" must be added in order that a correct result be obtained.

Thus the following rules for ADD may be stated:

*Rule 1.*—If the Accumulator Register and the Memory Register Signs are ALIKE, add the Accumulator Register value, in True form, to the Memory Register True value.

*Rule 2.*—If the Accumulator Register and Memory Register Signs are UNLIKE, add the 1's Complement of the Accumulator Register value, to the Memory Register True value.

*Rule 3.*—If the Accumulator Register and the Memory Register Signs are ALIKE, the Accumulator Register Sign is left unchanged.

*Rule 4.*—If the Accumulator Register and the Memory Register Signs are UNLIKE and (a) If NO End Carry results, it is an indication, that the value in the Accumulator Register was the larger, and the SUM, now in the Accumulator Register, is in Complement form. Therefore, it is necessary to Recomplement the present Accumulator Register factor and leave the Sign of the Accumulator Register, UN-CHANGED.

(b) If there IS an End Carry, it is an indication, that the value in the Memory Register was the larger, so that the SUM, now in the Accumulator Register, is in True form, but an "elusive 1" must be added to the result and the Sign, of the Accumulator Register, must be CHANGED.

ADD

Referring now to Timing Diagram for ADD, illustrated in FIG. 6k of said parent patent, it is seen, from the labeling, that during Instruction time, an I9 (D1) signal, gates a HALF word ADD Instruction, from Memory, via the Memory Buss to the Memory Register and, at I10 (D1) time, this ADD Instruction is "dumped" from the Memory Register into the Instruction Register. The Operation Decoder, determining that the operation is ADD, causes the Control Circuits to emit a GO TO EXECUTE signal, at I11 (D1) time, sending the Machine into an Execute cycle.

During this Execute cycle, specifically at E9 (D1) time, as indicated by ALL the labeling in FIG. 6k of said parent patent for this signal, a FULL, an EVEN half word, or an ODD half word is Read, out of Memory, via the Memory Busses to the Memory Register, and at E11 (D1) time, a GO TO EX/RGN signal is emitted, sending the Machine into an Execute/Regenerate cycle. The purpose of the Execute cycle, is to Read the FULL or HALF word, in Memory, into the Memory Register, preparatory to dumping this FULL or HALF word, into the Accumulator Register. The word Read, out of Memory, is Read from THE Address, specified by the Address portion of the ADD Instruction. The Execute/Regenerate cycle is required so that the actual addition can take place. During this Execute/Regenerate cycle, an E/R1 (D4) signal is emitted, as indicated by its labeling, for gating the holding of the Memory Register to the Adder. The factor, in the Accumulator Register, is also gated to the Adder at E/R1 (D4) time, in True or in Complement form, depending upon the Signs of the two factors, as indicated by the labeling in FIG. 6k of said parent patent. If the Signs are ALIKE, the value in the Accumulator Register is gated, in True form, to the Adder, but if the Signs are UNLIKE, the value, in the Accumulator Register, is gated, in Complement form, to the Adder, either operation taking place, under control of an E/R1 (D4) signal. Thus, by passing the value from the Memory Register to the Adder, and the value from the Accumulator Register, in True or in Complement form, to the Adder, an actual addition takes place. Because of the inherent nature of the Delay Units of the Adder, Carries, throughout the Adder, are propagated at a rapid rate, and, therefore, if an END CARRY ensues, it occurs almost immediately.

If the Signs are ALIKE, and the Adder 1 order emits a Carry signal, it is an indication of an Overflow, and the Carry output, of the Adder 1 order, is gated to the Overflow trigger by an E/R1 (D4) signal, to turn ON the Overflow trigger.

However, if the Signs are UNLIKE, a Complement of the value from the Accumulator Register, is gated to the Adder, and if an End Carry occurs from the Q order, under this latter condition, it is an End Carry and under Rule 4b, set out above, it is necessary to add an elusive 1 in the Adder 35 order, at approximately E/R1 (D4) time. After allowing 3 microseconds, for propagation of carries, which 3 microseconds provides a large safety factor, an E/R4 (D1) signal is emitted, as indicated in FIG. 6k of said parent patent, to gate the Sum, from the Adder, to the Accumulator Register.

As described above, this Sum, may be in True or in Complement form. If the Signs are UNLIKE, and NO End Carry resulted, then under RULE 4a above, it is known that the data in the Accumulator Register is in Complement form. Therefore, it is necessary to Recomplement the number, so that the final value, stored in the Accumulator Register, at the end of the ADD operation, is in True form. To produce this Re-Complement operation, an E/R7 (D2) signal is emitted as indicated in FIG. 6k of said parent patent for passing the holding of the Accumulator Register, in Complement form, to the Adder. At this time, there is NO other input to the Adder, so the effect is to merely pass information, through the Adder, in order to Complement the value. At E/R8 (D1) time, a signal is emitted, to gate the Re-Complemented output of the Adder, to the Accumulator Register, so that the Recomplementing operation is complete.

If the "original" Sum gated from the Adder to the Accumulator Register was in True form, then there was a carry from the Q order and this Recomplementing operation is NOT required.

At E/R10 (D1) time, the Accumulator Register Sign order is SET positive or negative, as required by the algebraic rules of addition. Thus, if the Signs of the Accumulator Register and the Memory Register, are UNLIKE, and an End Carry resulted, the Sign of the Accumulator Register is changed, as indicated by Rule 4b, above. Therefore, if the Sign of the Accumulator Register is positive, a negative Sign must be stored in the Accumulator Register Sign order, by a 1 microsecond signal, occurring at E/R10 time, labeled, as shown in FIG. 6k of said parent patent "(—) TO ACC (S)" whereby the Sign is changed, as described in connection with FIG. 7e, above by injecting a binary 1 directly into the Sign order, a binary 1 indicating a Minus Sign. If the Accumulator Register Sign is negative, under the same conditions, the signal emitted at E/R10 (D1) time, is labeled "(+) TO ACC (S)" as illustrated in FIG. 6k of said parent patent, which as described above, renders the line HOLD ACC (S) of FIG. 7e, minus to thereby insert a binary 0, in the Sign order of the Accumulator Register, which binary 0 is indicative of a positive Sign.

Thus, it is seen that if the Signs are UNLIKE, and if an End Carry did result, the Accumulator Register Sign is changed. At E/R10 (D2) time, the End of Operation signal is given, and the Instruction Counter is stepped, one count.

In the following examples of ADD operations, the Memory Register is illustrated as though its capacity was 4 bits only, to the right of the binary point, instead of the actual 35, and the same is true of the Accumulator Register. Both Overflow positions, respectively, are also indicated.

Example 1.—Accumulator Register and Memory Register SIGNS ALIKE:

(A)

Accumulator Register _____ +00.0101
Memory Register _____ +.1101

Result in Accumulator Register_ +01.0010

Note: An Overflow occurred, beyond the binary point, and this is noted, by turning ON the Overflow trigger, as described above.

(B)

Accumulator Register _____ −00.0101
Memory Register _____ −.0011

Result in Accumulator Register_ −00.1000

Example 2.—Accumulator Register and Memory Register SIGNS UNLIKE:

(A)

Accumulator Register _____ +00.0101
Complemented Accumulator Register _____ 11.1010
Memory Register _____ −.0111

C   00.0001  Since End Carry add
                            1  "elusive 1" and change
                                  Sign (Rule 4b)
Result in Accumulator Register_ −00.0010

(B)

Accumulator Register _____ +00.0101
Complemented Accumulator Register _____ 11.1010
Memory Register _____ −.0011

NC  11.1101  Since NO End Carry
Result in Accumulator Register_ +00.0010  Recomplement Accumulator and leave Sign unchanged (Rule 4a)

(C)

Accumulator Register _____ +00.0101
Complemented Accumulator Register _____ 11.1010
Memory Register _____ −.0101

NC  11.1111  Since NO End Carry
Result in Accumulator Register_ +00.0000  Recomplement Accumulator and leave Sign unchanged (Rule 4a)

(D)

Accumulator Register _____ −00.0101
Complemented Accumulator Register _____ 11.1010
Memory Register _____ +.0101

NC  11.1111  Since NO End Carry
Result in Accumulator Register_ −00.0000  Recomplement Accumulator and leave Sign unchanged (Rule 4a)

(E)

Accumulator Register _____ −00.0000
Complemented Accumulator Register _____ 11.1111
Memory Register _____ +.0000

NC  11.1111  Since NO End Carry
Result in Accumulator Register_ −00.0000  Recomplement Accumulator and leave Sign unchanged (Rule 4a)

In the examples, given above, Example 1A, illustrates a situation in which the Accumulator Register and the Memory Register Recomplemented, to contain a True value and the SIGN of the Accumulator Register is left UNCHANGED, that is, it is left, as a positive Sign. This operation gives a result of a POSITIVE ZERO. The example shown under 2D above, illustrates a problem wherein the SIGN of the Accumulator Register, is NEGATIVE, the SIGN of the Memory Register is POSITIVE and the numeric VALUES are EQUAL. Again, adding the Complement of the value in the Accumulator Register, to the value in the Memory Register, provides a Sum, for which NO End Carry occurs. Since there is NO End Carry, the value is Recomplemented, and the SIGN of the Accumulator Register, is left UNCHANGED. This leaves a NEGATIVE ZERO. Example 2E illustrates a problem in which a NEGATIVE ZERO in the Accumulator Register is ADDED TO a POSITIVE ZERO, in the Memory Register. During the addition of the Complement of value in the Accumulator Register, to the value in the Memory Register, NO End Carry occurs, and it is necessary to Recomplement the SUM reaching the Accumulator Register, and to leave the SIGN, UNCHANGED, the RESULT BEING A NEGATIVE ZERO. The problems illustrated under 2C, 2D, and 2E, respectively, indicate how the Machine operates, on either a POSITIVE or a NEGATIVE ZERO quantity.

ADD ABSOLUTE

The ADD ABSOLUTE operation whose Timing Diagram is illustrated in FIG. 6m of said parent patent is the same as the ADD operation just described, EXCEPT that the number in the Memory Register is TREATED as POSITIVE, regardless of its actual Sign. During Instruction time, an I9 (D1) signal, as indicated by its labeling, gates the half word Instruction from the Memory Buss to the Memory Register orders S and 1 through 17, and at I10 (D1) time, as indicated by the labeling, the Memory Register is "dumped" into the Instruction Register. At I11 (D1) time, a GO TO EXECUTE signal is emitted by the Control Circuits in accordance with the output of the Operation Decoder, which sends the Machine into an Execute cycle. At E9 (D1) time, a FULL word, an EVEN half word, or an ODD half word, depending on the Address of the ADD ABSOLUTE Instruction, is Read, out of Memory, to the Memory Buss and to the Memory Register. At E11 (D1) time, as indicated by the labeling, a GO TO EX/RGN signal is emitted, sending the Machine into an Execute/Regenerate cycle, during which an E/R1 (D4) signal is emitted, as indicated by the labeling to "dump" the holding of the Memory Register into the Adder. A signal, emitted at the same time, PROVIDED that the Accumulator Register value is positive, "dumps" the holding of the Accumulator Register, in True form, into the Adder, BUT, if the Accumulator Register Sign is negative, a signal at this time, "dumps" the holding of the Accumulator Register, in Complement form, into the Adder. Whether the holding of the Accumulator Register is gated to the Adder in True or in Complement form is dependent ONLY upon the holding of the Accumulator Register Sign order, since, as stated above, during an ADD ABSOLUTE operation, the Memory Register Sign is TREATED as POSITIVE. If the Accumulator Register Sign is positive, and a Carry occurs from the Adder 1 order, then at E/R1 (D4) time, as indicated by the labeling, this Carry is gated to the Overflow trigger to turn it ON. This is a real Overflow carry since the Sign of the Accumulator Register being positive, BOTH values therefore, are treated as POSITIVE, so that any carry, from the Adder 1 order, is an Overflow. However, if the Accumulator Register Sign is negative and a Carry occurs, from the Adder Q order, it is an indication of an End Carry, since, with the Accumulator Register Sign negative, the Complement of the holding of the Accumulator Register is being added, in the Adder. Under these conditions, an "elusive 1" must be added to the Adder order 35, so that an E/R1 (D4) signal is emitted as indicated by the labeling in FIG. 6m of said parent patent, to the line CARRY ADDER (35) to thereby add a one, to the Adder 35 order. This four microsecond signal will allow sufficient time for carries to propagate, INCLUDING Carries, caused by a first End Carry, which adds a one to the Adder 35 order, and may therefore cause propagation of additional carries. At E/R4 (D1) time, as indicated by the labeling, a signal is emitted for "dumping" the output of the Adder into the Accumulator Register, which stores the Sum resulting from the ADD ABSOLUTE process, replacing what was formerly contained in the Accumulator Register. If the holding of the Accumulator Register was positive or, if the holding of the Accumulator Register was negative and a Carry occurred, the value thus stored in the Accumulator Register is in True form. However, if the Accumulator Register were negative, and NO carry resulted, the Sum thus stored in the Accumulator Register is in Complement form, and an E/R7 (D2) signal, as indicated by its labeling, is emitted for passing the holding of the Accumulator Register, in Complement form, to the Adder, and an E/R8 (D1) signal is emitted, for gating the holding of the Adder to the Accumulator Register, to thereby effect a Recomplementing operation to thus store a True Value, in the Accumulator Register.

The Sign of the Accumulator Register is left undisturbed, unless the Accumulator Register Sign, is negative, and a Carry occurred. In such an event, an E/R10 (D1) signal is emitted, to store a POSITIVE Sign in the Accumulator Register Sign order. At E/R10 (D2) time, at two microsecond End of Operation signal is emitted and also an E/R10 (D2) signal which is effective, as indicated by the labeling in FIG. 6m of said parent patent, to step the Instruction Counter.

Thus it is seen, that during an ADD ABSOLUTE operation, the ABSOLUTE value of the number, stored in the Memory Register, is TREATED as having a POSITIVE Sign, regardless of its actual Sign, and its true value is added to the True or Complement value stored in the Accumulator Register, according to the conditions described, just above.

SUBTRACT

A SUBTRACT operation is quite similar to the ADD operation, described above, except that certain rules, for handling the information, depending upon the Signs of the factors being subtracted, govern the operation. The SUBTRACT Instruction directs the Machine to subtract the number Read, out of Memory to the Memory Register, from the value stored in the Accumulator Register. This SUBTRACT operation proceeds according to the following rules:

*Rule 1.*—If the Accumulator Register and the Memory Register Signs are ALIKE, the value, in the Memory Register, is added to the 1's Complement of the value, in the Accumulator Register.

*Rule 2.*—If the Accumulator Register and Memory Register Signs are UNLIKE, the True value of the value, in the Accumulator Register, is added to the value stored in the Memory Register.

*Rule 3.*—If the Signs of the Memory Register and the Accumulator Register are UNLIKE, the Accumulator Sign is NOT changed.

*Rule 4.*—If the Memory Register and the Accumulator Register Signs are ALIKE, and (a) If NO End Carry results, the result, stored in the Accumulator Register, is in Complement form, and therefore, must be Recomplemented, and the Sign of the Accumulator Register is left UNCHANGED.

(b) If there IS an End Carry, an "elusive 1" must be added to the Adder 35 order, and the Sign of the Accumulator Register is CHANGED.

Refer now to the FIG. 6n of said parent patent, which illustrates the Timing Diagram for a SUBTRACT operation. During I9 (D1) of Instruction time, as indicated by the labeling, a half word Instruction, is gated from the Memory Buss to the Memory Register, and at I10 (D1) time, this half word Instruction is gated, from the Memory Register to the Instruction Register. The Operation Decoder, then being energized, and indicating that a SUBTRACT operation is to take place, causes the Control Circuits to emit a GO TO EXECUTE signal at I11 (D1) time. During this Execute cycle, an E9 (D1) signal, as indicated by the labeling, is emitted, for gating a FULL word, an EVEN half word, or an ODD half word, from the Memory Buss to the Memory Register. Thereafter, a GO TO EX/RGN signal is emitted at E11 (D1) time, to send the Machine into Execute/Regenerate time. During the Executive/Regenerate cycle, an E/R1 (D4) signal, as indicated by the labeling, is emitted, for gating the holding of the Memory Register to the Adder, and, if the Signs are UNLIKE, an E/R1 (D4) signal, as indicated by the labeling, gates the holding of the Accumulator Register, in True form, to the Adder. However, if the Signs are ALIKE, an E/R1 (D4) signal gates the holding of the Accumulator Register, in Complement form, to the Adder.

During addition with the Signs UNLIKE, if a Carry is emitted, by the Adder 1 order, as the information is passed through the Adder, since two True numbers are being passed, through the Adder, this is an indication that a true Overflow has occurred, and this Carry signal is effective to turn ON, the Overflow trigger. However, if the Signs are ALIKE, which means that the True number, from the Memory Register, is being added, to the Complement of the number, in the Accumulator Register and if the Adder Q order carries as the information is passed through the Adder, then it is necessary to add an "elusive 1" to the Adder order 35. This occurs, practically simultaneously, with the passage of information through the Adder and is represented, in FIG. 6n of said parent patent, by an E/R1 (D4) signal labeled CARRY ADDER (35). The output from the Adder, in either event, whether the Signs, are alike, or unlike, is gated to the Accumulator Register, by an E/R4 (D1) signal, as indicated by the labeling in FIG 6n of said parent patent, this output, from the Adder, replacing the former holding of the Accumulator Register.

If the Signs are UNLIKE, NO End Carry occurs, so that the value stored in the Accumulator Register is in True form.

If, however, the Signs are ALIKE, and NO Carry occurs, then the Sum, stored in the Accumulator Register, is in Complement form, and in order to Recomplement this Sum, an E/R7 (D2) signal, as indicated by the labeling, is emitted, to pass the Complement, of the holding of the Accumulator Register, to the Adder, and thereafter, an E/R8 (D1) signal, is emitted, for gating the holding of the Adder to the Accumulator Register. At this time, manipulation of the NUMERIC values is complete, and only the Accumulator Register Sign must be fixed. The Sign of the Accumulator Register, remains the same, unless the original Signs were ALIKE and an End Carry occurred. Under these conditions, if the Accumulator Register Sign is negative, the Accumulator Register Sign is changed, by an E/R10 (D1) signal, as indicated by its labeling, which injects a positive Sign, in the Accumulator Register Sign order. However, if under the same conditions, the Accumulator Register Sign is positive, a negative Sign indication is stored, in the Accumulator Register Sign order, by an E/R10 (D1) signal, as indicated by its labeling. The End of Operation signal and the signal, for stepping the Instruction Counter, are, as usual, emitted at E/R10 (D2) time.

Thus, it is seen that the Instruction calling for a SUBTRACT operation, will cause the number, Addressed and Read, out of Memory, to the Memory Register, to be subtracted from the number, in the Accumulator Register, according to the algebraic rules of SUBTRACT. During SUBTRACT operations, the Calculator handles POSITIVE AND NEGATIVE ZERO values, with equal facility, as will be apparent in certain ones of the following examples.

Example 1.—Accumulator Register and Memory Register ALIKE:

(A)
Accumulator Register_____ +00.0101
Complemented Accumulator Register_____ 11.1010
Memory Register_____ +.0011
                           ―――――――
                       NC  11.1101 Since NO End Carry
Result in Accumulator Register_ +00.0010 Recomplement Accumulator, leave Sign UNCHANGED (Rule 4a).

(B)
Accumulator Register_____ −00.0101
Complemented Accumulator Register_____ 11.1010
Memory Register_____ −.0101
                           ―――――――
                       NC  11.1111 Since NO End Carry
Result in Accumulator Register_ −00.0000 Recomplement Accumulator, and leave Sign UNCHANGED (Rule 4a).

(C)
Accumulator Register_____ −00.0101
Complemented Accumulator Register_____ 11.1010
Memory Register_____ −.0111
                           ――――――― Since an End Carry 1 Add
                       C   00.0001   "elusive 1" and
Result in Accumulator Register_ +00.0010 CHANGE Sign (Rule 4b)8

Example 2.—Accumulator Register and Memory Register SIGNS UNLIKE:

(A)
Accumulator Register_____ +00.0101
Memory Register_____ −.0011

Result in Accumulator Register_ +00.1000

(B)
Accumulator Register_____ −00.0101
Memory Register_____ +.1101

Result in Accumulator Register_ −01.0010

NOTE.—Overflow, beyond binary point, is noted, by turning ON the Overflow trigger.

In the above examples, Example 1A, illustrates a situation in which a positive value, in the Memory Register, is substracted from a positive value, in the Accumulator Register, with a resultant Sum and NO Carry. Since there is NO End Carry, the value in the Accumulator Register is Recomplemented, and the Sign is left UNCHANGED, according to Rule 4a, for SUBSTRACT described above. Example 1B, illustrates a problem, in which a negative value, in the Memory Register, is substracted from a negative value, in the Accumulator Register, the numeric values being equal. Since NO End Carry results, from the Sum, the Accumulator Register, is Recomplemented, and the Sign is left UNCHANGED, so that the result, left in the Accumulator Register, is a NEGATIVE ZERO. In Example 1C, a negative quantity, in the Memory Register, is substratced, from a negative value, in the Accumulator Register. Since, as a result of this substraction, an End Carry results, the "elusive 1" is added, to the least significant order of the Adder, and the Sign of the Accumulator Register, is CHANGED, in accordance with the conditions set out, in Rule 4b above. Examples 2A and 2B, illustrate operations, involving subtraction of a quantity in the Memory Register from a quantity in the Accumulator Register, when the Signs are UNLIKE. In Example 2B, an Overflow occurs and this Overflow is noted, as stated above, by the Overflow trigger being turned ON.

SUBTRACT ABSOLUTE

Refer now to FIG. 6p of said parent patent which illustrates the Timing Diagram for a SUBBTRACT ABSOLUTE operation. This operation is the same as an ADD operation, described above, EXCEPT that the number in the Memory Register, which has been Read, from Memory, is TREATED as a NEGATIVE quantity, regardless of its actual Sign. At I9 (D1) time, of Instruction time, preceding the SUBTRACT ABSOLUTE operation, as indicated by the labeling, a half word Instruction is gated, from the Memory Buss to the Memory Register orders, S, and 1 through 17, and thereafter, an I10 (D1) signal gates this half word instruction, from the Memory Register to the Instruction Register. The operation Decoder, then being energized to indicate a SUBTRACT ABSOLUTE operation, causes the Control a GO TO EXECUTE signal at I11 (D1) this Execute cycle, an E9 (D1) time is effectuated by the labeling, to gate a FULL word, an EVEN half word or an ODD half word, from the Memory Busses to the Memory Register, depending upon the Address, called for by this SUBTRACT ABSOLUTE Instruction. Thereafter, a GO TO EX/RGN signal is emitted at E11 (D1) time, sending the Machine into an Execute/Regenerate cycle. During the Execute/Regenerate cycle, an E/R1 (D4) signal is emitted, as indicated by the labeling, for gating the holding of the Memory Register, to the Adder, and if the Accumulator Register Sign is negative, which is an indication that the Signs are ALIKE, since the Memory Register Sign is treated as being negative, an E/R1 (D4) signal, as indicated by the labeling, gates the holding of the Accumulator Register, in True form, to the Adder. However, if the Accumulator Register Sign was positive, which is equivalent to having UNLIKE Signs, the holding of the Accumulator Register, in Complement form, is gated to the Adder. While this information is being gated to the Adder, if the Accumulator Register Sign is negative, and a Carry is emitted, from the Adder 1 order, it is an indication that a true Overflow has occurred, since only True values are being passed, through the Adder. This Adder 1 order Carry is employed, to turn ON the Overflow trigger. IF, however, the Accumulator Register Sign is positive, and if the Adder Q order, carries, it is an End Carry, and an "elusive 1" is added, to the Adder 35 order, by the insertion of a Carry in the Adder 35 order, by an E/R1 (D4) signal, as indicated by the labeling. Three microseconds are allowed, for all Carries to propogate and an E/R4 (D1) signal, is emitted, as indicated by the labeling, for gating the output of the Adder to the Accumulator Register, thereby replacing what was formerly held in the Accumulator Register.

If the Accumulator Register Sign is positive, and there is NO End Carry, the Sum, thus stored in the Accumulator Register is in Complement form, and an E/R7 (D2) signal, as indicated by the labeling, transmits the Complement of the Accumulator Register to the Adder to thus Recomplement the Accumulator Register, and at E/R8 (D1) time, the Adder output is transferred to the Accumulator Register.

If the Accumulator Register Sign is positive, and a Carry ensues, then at E/R10 (D1) time, as indicated by the labeling, a negative Sign is stored in the Accumulator Register Sign order, regardless of the former holding of the Accumulator Register Sign order. Otherwise, the Accumulator Register Sign order is left undisturbed. The usual End of Operation signal and the signal for stepping the Instruction Counter, one count, are emitted at E/R10 (D2) time.

Thus, it is seen that during a SUBTRACT ABSOLUTE operation, the number in the Memory Register is added to the number in the Accumulator Register, according to the algebraic rules of addition, with the number in the Memory Register being treated as negative, regardless of its actual Sign.

RESET ADD

Referring to FIG. 6q of said parent patent, which illustrates the Timing Diagram for a RESET ADD operation, at I9 (D1) time, of Instruction time, as indicated by the labeling, a half word Instruction, is gated, from the Memory Busses to the Memory Register, and thereafter, at I10 (D1) time, this half word Instruction is gated, from the Memory Register to the Instruction Register. The Operation Decoder, then being energized to indicate a RESET ADD operation causes the Control Circuits to emit a GO TO EXECUTE signal, at I11 (D1) time, so that the Machine proceeds to an Execute cycle. During the Execute cycle, an E9 (D1) signal is emitted, as indicate by the labeling, to gate a FULL word, an EVEN half word, or an ODD half word, from the Memory Buss, to the Memory Register, depending upon the Address, of this half word RESET ADD Instruction. Thereafter, a GO TO EX/RGN signal is emitted at E/R11 (D1) time, to send the Machine into an Execute/Regenerate cycle. During the Execute/Regenerate cycle, an E/R1 (D4) signal, as indicated by its labeling, is emitted, for gating the holding of the Memory Register, to the Adder. However, it should be noted, that the holding of the Accumulator Register is NOT gated to the Adder. This, in effect is as though the Accumulator Register, had been Reset to zero, since an E/R4 (D1) signal, as indicated by the labeling, is emitted, for gating the holding of the Adder, which is merely the word originally held in the Memory Register, to the Accumulator Register, which replaces the value formerly stored, in the Accumulator Register. At E/R10 (D1) time, the Accumulator Register Sign order is set to "correspond" to the Memory Register Sign order, which completes the operation. In other words, if the Memory Register Sign is negative, a Minus Sign is stored in the Accumulator Register Sign order but if the Memory Register Sign is positive, a positive Sign is stored in the Accumulator Register Sign order.

Thus, on a RESET ADD operation, the full word or the half word Read, out of Memory, into the Memory Register, is stored in the Accumulator Register, replacing the value, formerly stored, in the Accumulator Register. The usual End of Operation signal and the signal for stepping the Instruction Counter, are emitted, at E/R10 (D2) time.

RESET SUBTRACT

The operation, during a RESET SUBTRACT Instruction, is similar to that described above, for RESET ADD except that the Accumulator Register Sign order is set differently. During a RESET SUBTRACT operation, the Accumulator Register Sign order is SET to the OPPOSITE of the Memory Register Sign order. Thus, it may be stated that during a RESET SUBTRACT operation, this Instruction is Read, out of Memory, to the Memory Buss, and into the Memory Register, at I9 (D1) of Instruction time, as illustrated in FIG. 6r of said parent patent, and the Memory Register is "dumped" into the Instruction Register, at I10 (D1) time, the Machine produces a GO TO EXECUTE signal, at I11 (D1) time, to send the Machine into an Execute cycle whereupon, at E9 (D1) time, as indicated by the labeling, a FULL word, an EVEN half word, or an ODD half word is Read, out of Memory, depending upon the Address portion of this RESET SUBTRACT Instruction, whereupon the Control Circuits produce a GO TO EX/RGN signal at E11 (D1) time, to send the Machine into an Execute/Regenerate cycle. The Memory Register is gated to the Adder, at E/R1 (D4) time and from the Adder to the Accumulator Register at E/R4 (D1) time, to thus replace, the value formerly stored in the Accumulator Register. If the Memory Register Sign is negative, a POSITIVE Sign is stored in the Accumulator Register Sign order, by an E/R10 (D1) signal but, if the Memory Register Sign is positive, a NEGATIVE Sign is stored, in the Accumulator Register Sign order, by an E/R10 (D1) signal. The End of Operation signal and the signal, for stepping the Instruction Counter are emitted at E/R10 (D2) time.

Operations such as: STORE; STORE MULTIPLIER QUOTIENT REGISTER; STORE ADDRESS; LONG SHIFT LEFT; LONG SHIFT RIGHT; SHIFT ACCUMULATOR LEFT; SHIFT ACCUMULATOR RIGHT; MULITPLY AND MULITPLY AND ROUND; and DIVIDE are described between column 137, line 31, and column 153, line 25 of said Haddad et al. Patent 2,974,866.

While there has been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the inten-

What is claimed is:

1. A plural order adder device comprising means for alegbraically adding a first signed multidigit factor to a second signed multidigit factor, means for checking the signs of these factors to be added, and means, operative, if said signs are alike, to add the true value of said first factor to the true value of said second factor.

2. A device as in claim 1 and including means, operative if the signs are unlike, to add the complement of said first factor to the true value of said second factor.

3. A device as in claim 2 and including means checking for an end carry from said adder when said factors are added, and means, effective upon ascertainment of such an end carry to add an elusive 1 to the result.

4. A device as in claim 3 and including means, effective when no carry is ascertained, to recomplement the first sum.

5. A device as in claim 1, and including means for leaving the sign of the sum the same, as that of the two factors.

6. In a novel binary parallel adder device comprising, in combination, a plurality of orders, each consisting of a full binary adder comprising diode AND circuits and diode OR circuits, and each having a sum output and a carry output, the carry outputs of each lower order feeding to the carry input of the next higher order and a plurality of half binary adder overflow orders each comprising diode AND circuits and a diode OR circuit and each having a sum output and a carry output, a lower order carry output feeding to the carry input of the next higher half binary adder.

7. A device as in claim 6 and including means for feeding two factors into each of said full binary adder orders, and one factor only, into each of said overflow orders, and the highest full binary adder order feeding to the carry input of the lowest half adder order.

8. A device as in claim 7 and including means for selectively converting one of said factors being fed to said full binary adder orders, to complement form, and the single factor fed to said overflow orders being selectively converted to complement form.

9. A device as in claim 8 and including an accumulator register having an order for each order of the adder including said overflow orders, respectively connected to the sum outputs of each of said adder orders.

10. A device as in claim 9, each of said orders of said accumulator register comprising a delay unit, whereby an input from the sum output of each of the adder orders can be applied to the inputs of the respective accumulator orders, while an output, indicative of a previous value stored in said accumulator register, is available at the accumulator order outputs, respectively.

11. A device as in claim 10 and including means connecting the respective outputs of said accumulator orders to one input of each of said adder orders, including said overflow orders, whereby each output of the accumulator register orders is applied to said one input of the respective orders of said adder while the respective sum outputs of each order of the adder are applied to the inputs of each corresponding order of the accumulator register.

12. A binary adding device comprising a plurality of orders, each order respectively comprising a full binary adder of diode AND circuits and diode OR circuits, a carry output of each order being connected to the input of the immediately higher order, means for supplying two factor inputs to each of said orders, and means for inverting one of said factor inputs, selectively, to a complement value, whereby said adding device may selectively add or subtract.

13. A device comprising an accumulator register having a plurality of orders, means providing an indication of the algebraic sign of a first factor, stored in said accumulator register, means for adding a second factor to the first factor stored in said accumulator register, means ascertaining the sign of said second factor, and means operative to add the true value of the factor in said accumulator register to the true value of said second factor, only when said signs are alike.

14. A device as in claim 13 and including means changing the factor stored in said accumulator register to its complement value, when said signs are unlike, before adding it to said second factor.

15. A device as in claim 14 and including, means effective to maintain said accumulator register sign indication unchanged, if both said signs are alike.

16. A device as in claim 15 and including, means rendered operative, if said signs are unlike and no end carry results from said addition, to recomplement the factor in said accumulator and render the sign of said sum the same as that of said first factor.

17. A device as in claim 16 and including, means rendered operative if said signs are unlike and that there is an end carry, to add an elusive 1 to the value in the lowest order and to change the sign of said accumulator register.

18. A device as in claim 13 and including, means operative when said second factor, added to said first factor, results in a sum of 0, to maintain said accumulator sign indication unchanged.

References Cited by the Examiner

UNITED STATES PATENTS

| | | | |
|---|---|---|---|
| 2,610,790 | 9/52 | Elliott | 235—176 |
| 2,694,521 | 11/54 | Newman | 235—176 |
| 2,780,409 | 2/57 | Hardenberg | 235—175 |
| 2,888,201 | 5/59 | Housman | 235—175 |
| 2,962,216 | 11/60 | Housman | 235—175 |
| 2,994,478 | 8/61 | Sarahan et al. | 235—175 |

MALCOLM A. MORRISON, *Primary Examiner.*

CORNELIUS D. ANGEL, WALTER W. BURNS,
*Examiners.*

UNITED STATES PATENT OFFICE
CERTIFICATE OF CORRECTION tent No. 3,197,624                          July 27, 1965

Jerrier A. Haddad et al.

It is hereby certified that error appears in the above numbered pat-
, requiring correction and that the said Letters Patent should read as
˙rected below.

Column 22, line 75, after "Memory Register" insert the
llowing:

SIGNS are BOTH POSITIVE, so that when the values are added, an Overflow occurs. Example 1B illustrates a situation in which the Accumulator Register and Memory Register SIGNS are BOTH NEGATIVE, and when the values are added, to obtain a Sum, NO Overflow occurs. Example 2A illustrates a situation in which the Accumulator Register SIGN is POSITIVE, the Memory Register SIGN is NEGATIVE and its value is GREATER THAN that of the Accumulator Register. In this instance, an End Carry DOES occur, so an "elusive 1" is added to the Sum obtained from adding the Complement of the value in the Accumulator Register to the value in the Memory Register, to thus obtain the final Sum, and the Sign of the Accumulator Register is CHANGED. Example 2B illustrates a situation in which the Accumulator Register SIGN is POSITIVE, the Memory Register SIGN is NEGATIVE and the value in the Memory Register is GREATER THAN the value in the Accumulator Register. Upon addition of the Complement of the number in the Accumulator Register, to the number in the Memory Register, NO End Carry results, so the Sum, in the Accumulator Register is a Complement number, and Recomplementing is necessary to obtain a True value in the Accumulator Register, and its SIGN is left UNCHANGED. Example 2C illustrates a situation in which the SIGN of the Accumulator Register is POSITIVE, the SIGN of the Memory Register is NEGATIVE, and numeric VALUES ARE EQUAL. Upon addition of the Complement of the value in the Accumulator Register to the value in the Memory Register, NO End Carry results. Since NO End Carry results, the Sum, reaching the Accumulator Register is Signed and sealed this 17th day of May 1966.

(SEAL)
Attest:

ERNEST W. SWIDER                     EDWARD J. BRENNER
Attesting Officer                  Commissioner of Patents